US009550584B1

(12) United States Patent
Harvey et al.

(10) Patent No.: US 9,550,584 B1
(45) Date of Patent: Jan. 24, 2017

(54) DEPLOYABLE THIN MEMBRANE APPARATUS

(71) Applicant: MMA Design, LLC, Boulder, CO (US)

(72) Inventors: Thomas Jeffrey Harvey, Nederland, CO (US); Shane Eric Stamm, Boulder, CO (US)

(73) Assignee: MMA Design, LLC, Boulder, CO (US)

( * ) Notice: Subject to any disclaimer, the term of this patent is extended or adjusted under 35 U.S.C. 154(b) by 97 days.

(21) Appl. No.: 14/563,957

(22) Filed: Dec. 8, 2014

Related U.S. Application Data

(63) Continuation-in-part of application No. 12/924,586, filed on Sep. 30, 2010, now Pat. No. 8,905,357.

(51) Int. Cl.
*B64G 1/22* (2006.01)

(52) U.S. Cl.
CPC ................... *B64G 1/222* (2013.01)

(58) Field of Classification Search
CPC ................................................ B64G 1/222
See application file for complete search history.

(56) References Cited

U.S. PATENT DOCUMENTS

| 836,868 | A | * | 11/1906 | Dangerfield | E04B 1/3441 52/109 |
| 967,116 | A | * | 8/1910 | Dupuis | E04B 1/3441 52/109 |
| 1,708,113 | A | * | 4/1929 | Allen | E06C 5/28 105/238.1 |
| 2,363,784 | A | * | 11/1944 | Gerich | B66C 23/34 182/141 |
| 3,493,765 | A |  | 2/1970 | Kelly et al. |  |
| 3,496,687 | A | * | 2/1970 | Greenberg | B64G 9/00 294/86.4 |
| 3,530,469 | A | * | 9/1970 | Morgan | B64G 1/222 244/172.6 |
| 3,631,505 | A | * | 12/1971 | Carman | H01Q 15/161 343/915 |
| 3,710,806 | A | * | 1/1973 | Kelly | E04B 1/3441 135/145 |
| 3,735,942 | A |  | 5/1973 | Palz |  |
| 3,735,943 | A | * | 5/1973 | Fayet | B64G 1/222 136/245 |
| 4,380,013 | A | * | 4/1983 | Slysh | F24J 2/1052 136/245 |
| 4,426,052 | A |  | 1/1984 | Hubert et al. |  |
| 4,557,083 | A | * | 12/1985 | Zanardo | B64G 9/00 244/159.5 |
| 4,614,319 | A |  | 9/1986 | Drexler |  |

(Continued)

*Primary Examiner* — Brian M O'Hara
*Assistant Examiner* — Steven Hawk
(74) *Attorney, Agent, or Firm* — Christopher J. Kulish

(57) ABSTRACT

A deployable thin membrane apparatus for use with a spacecraft is provided. The apparatus includes a flexible membrane structure and a deployment mechanism for transitioning the membrane structure from an undeployed state towards a deployed state in which the membrane can perform a function needed by a spacecraft. In one embodiment, the deployment mechanism includes a plurality of pantographs that each engage the membrane structure, a rotatable disk structure that engages and coordinates the transition of the pantographs from an undeployed state towards a deployed state, and a spring system for providing energy that is used to rotate the disk structure.

17 Claims, 27 Drawing Sheets

(56) References Cited

U.S. PATENT DOCUMENTS

| | | | |
|---|---|---|---|
| 4,854,526 A | 8/1989 | Rochefort | |
| 5,052,640 A | 10/1991 | Chang | |
| 5,108,047 A | 4/1992 | Puech | |
| 5,196,857 A * | 3/1993 | Chiappetta | B64G 1/22 244/159.5 |
| 5,323,526 A * | 6/1994 | Saul | A47C 1/0345 29/434 |
| 5,379,977 A * | 1/1995 | Ronn | B66F 3/22 248/277.1 |
| 5,386,953 A | 2/1995 | Stuart | |
| 5,421,356 A * | 6/1995 | Lynch | E04H 15/50 135/145 |
| 5,518,209 A | 5/1996 | Chicoine et al. | |
| 5,527,001 A * | 6/1996 | Stuart | B64G 1/1007 136/245 |
| 5,680,145 A * | 10/1997 | Thomson | F24J 2/125 343/840 |
| 5,697,582 A | 12/1997 | Surauer et al. | |
| 5,755,406 A | 5/1998 | Aston et al. | |
| 5,857,648 A * | 1/1999 | Dailey | B64G 1/222 244/172.6 |
| 5,864,324 A * | 1/1999 | Acker | H01Q 15/168 343/912 |
| 6,016,999 A | 1/2000 | Simpson et al. | |
| 6,035,877 A * | 3/2000 | Losi, Jr. | E04H 15/322 135/131 |
| 6,194,790 B1 | 2/2001 | Griffin et al. | |
| 6,219,974 B1 | 4/2001 | Hoberman | A63F 9/088 446/478 |
| 6,240,940 B1 * | 6/2001 | Carter | E04H 15/50 135/127 |
| 6,478,261 B2 | 11/2002 | Laraway et al. | |
| 6,568,640 B1 * | 5/2003 | Barnett | B64G 1/222 244/158.3 |
| 6,585,193 B1 * | 7/2003 | Kustas | B64G 1/222 244/169 |
| 6,689,952 B2 | 2/2004 | Kawaguchi | |
| 7,044,146 B2 * | 5/2006 | Losi, Jr. | E04H 15/50 135/131 |
| 7,100,333 B2 * | 9/2006 | Hoberman | E04B 1/3211 135/29 |
| 7,530,364 B2 * | 5/2009 | Carter | E04H 15/50 135/131 |
| 7,624,747 B2 * | 12/2009 | Carter | E04H 15/50 135/135 |
| 7,714,797 B2 | 5/2010 | Couchman et al. | |
| 7,762,500 B1 * | 7/2010 | Dhall | B60F 5/02 244/123.1 |
| 7,845,708 B2 * | 12/2010 | Breidenbach | B62D 35/001 296/180.1 |
| 7,857,376 B2 * | 12/2010 | Breidenbach | B62D 35/001 296/180.1 |
| 8,308,111 B2 | 11/2012 | Lu et al. | |
| 8,485,475 B2 | 7/2013 | Allen et al. | |
| 8,627,738 B2 * | 1/2014 | Breidenbach | B62D 35/004 74/469 |
| 8,776,816 B2 * | 7/2014 | Danziger | E04H 15/48 135/139 |
| 8,905,357 B1 * | 12/2014 | Harvey | B64G 1/007 244/168 |
| 8,919,617 B2 * | 12/2014 | Foley | B65D 83/0033 222/325 |
| 9,168,659 B2 * | 10/2015 | Doggett | B25J 18/00 |
| 9,169,634 B2 * | 10/2015 | Guerrero | E04B 1/344 |
| 9,281,569 B2 * | 3/2016 | Taylor | H01Q 1/288 |
| 2002/0074458 A1 | 6/2002 | Laraway et al. | |
| 2003/0010869 A1 * | 1/2003 | Kawaguchi | H01Q 15/161 244/168 |
| 2003/0010870 A1 * | 1/2003 | Chafer | B64G 1/222 244/171.5 |
| 2005/0230558 A1 | 10/2005 | Nakasuka | |
| 2011/0023484 A1 | 2/2011 | Lu et al. | |
| 2011/0242663 A1 | 10/2011 | Dailey et al. | |

\* cited by examiner

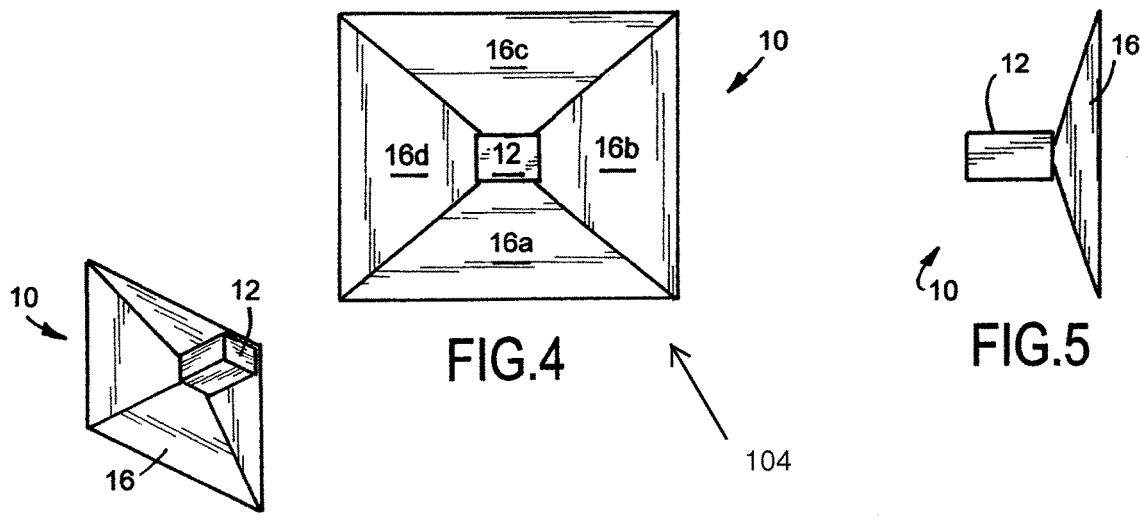
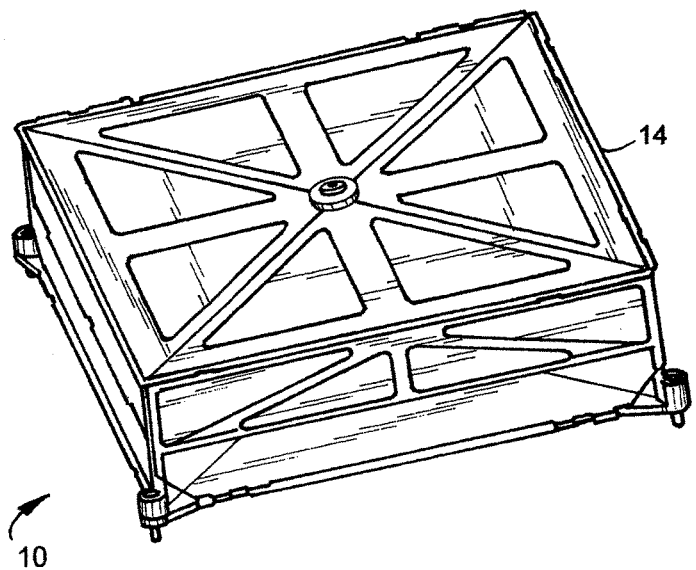

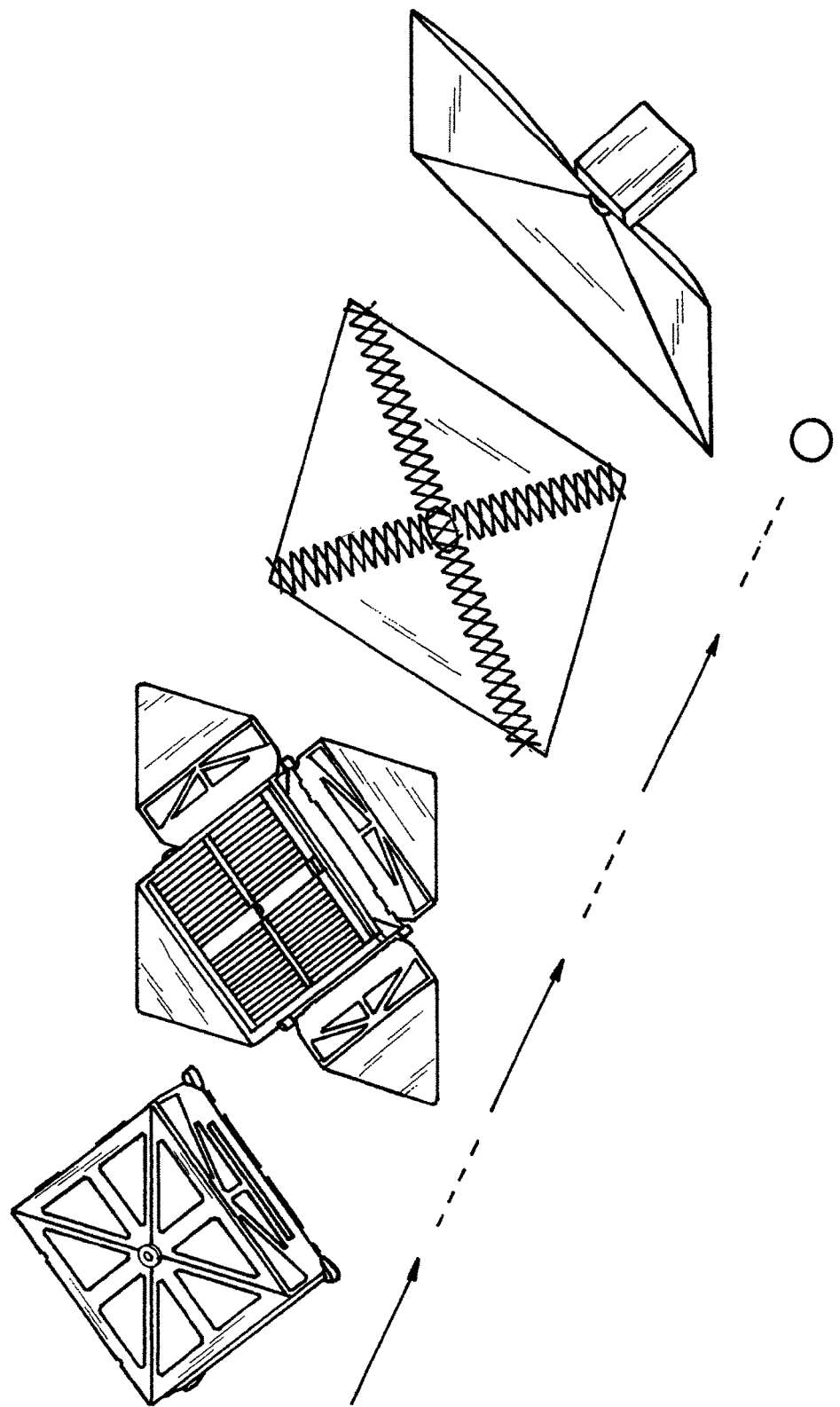

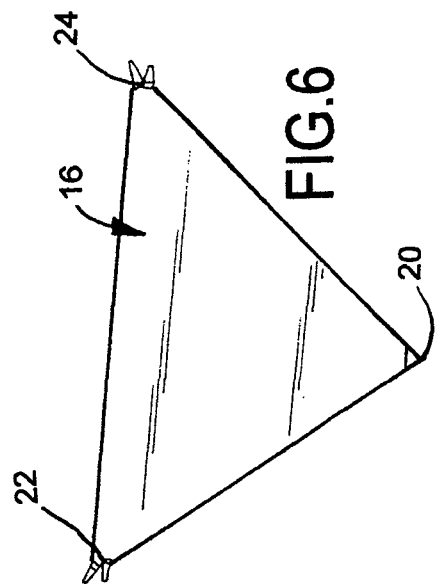
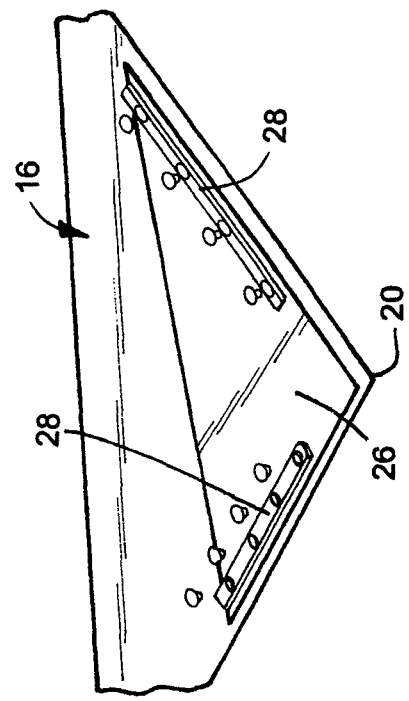
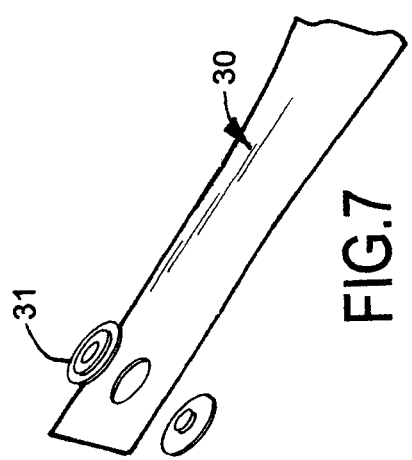

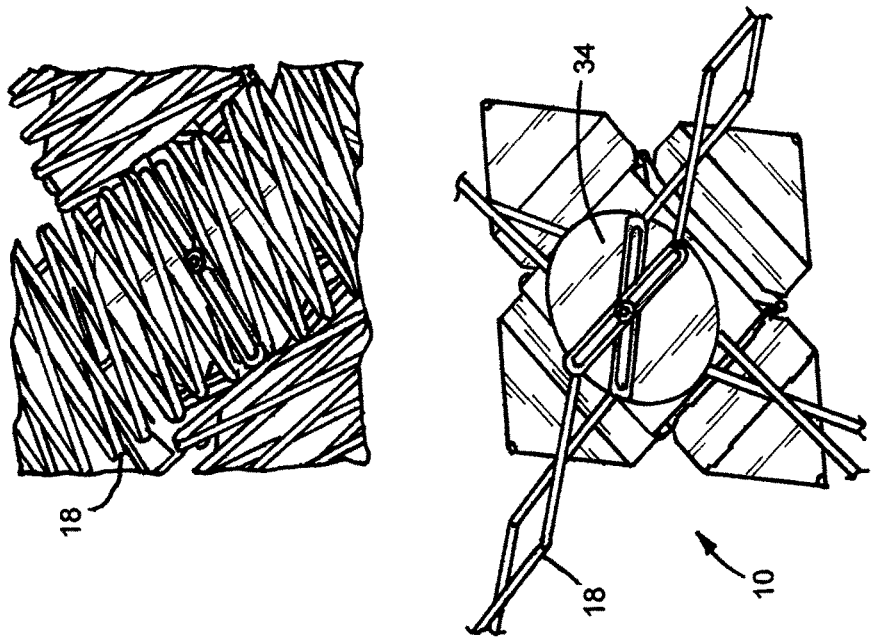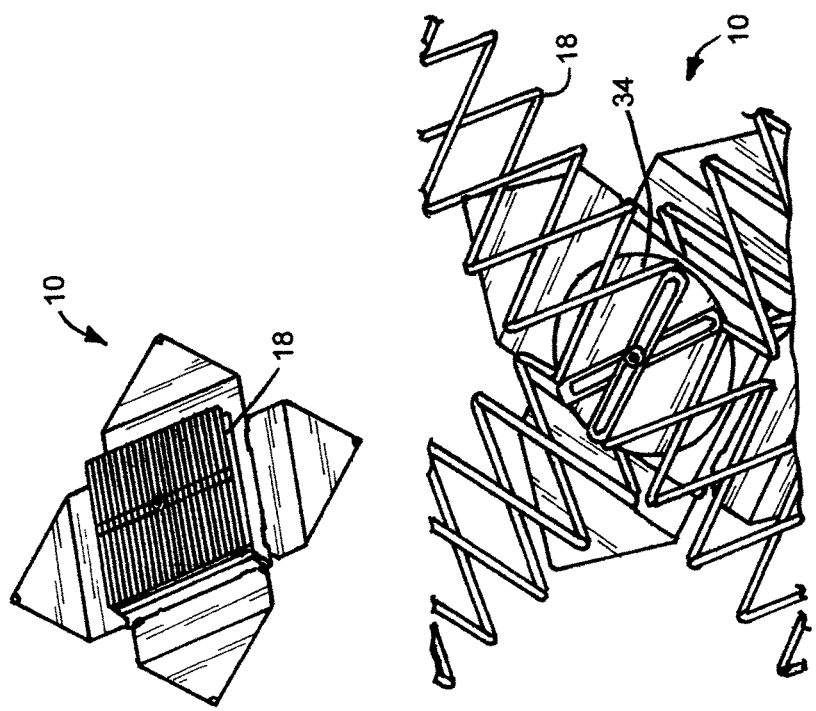
FIG.16

DEPLOYABLE THIN MEMBRANE APPARATUS

STATEMENT REGARDING FEDERALLY SPONSORED RESEARCH

This invention was made with support from the U.S. Government under contract FA9453-10-C-033 awarded by the U.S. Air Force Research Laboratory. The U.S. Government has certain rights in the invention.

FIELD OF THE INVENTION

The invention relates to a deployable thin membrane apparatus suitable for use with spacecraft.

BACKGROUND OF THE INVENTION

Spacecraft typically employ one or more structures have relatively large dimensions when operational. Among these structures are solar sails, antennas, solar arrays, heat shields, de-orbiters and the like. Typically, these structures transition between an undeployed state in which the structures do not provide or only provide in a limited fashion the desired function for the spacecraft and a deployed state in which the structures provide the desired function for the spacecraft. In many instances, these structures must occupy a constrained space when in the undeployed state. In some instances, the structure may have the same dimensions in the constrained space of the undeployed state as the structure has in deployed state. For instance, the dimensions of a flat solar wing that is disposed parallel to the flat side of a spacecraft in an undeployed state has the same dimensions when disposed so as to extend perpendicular to the side of the spacecraft in the deployed state. In other instances, the structure has different dimensions in the constrained space of the undeployed state than the structure has in the deployed state. For example, the dimensions of a solar wing comprised of a number of rigid solar panels that are connected to one another with hinges that allow the panels to be folded in an accordion fashion in the undeployed state are different than when the panels are unfolded to realize a planar structure in the deployed state. For various reasons, structures that employ flexible membranes in which the dimensions in the constrained space of the undeployed state are different than in the deployed state are also employed. Among the reasons for employing flexible membranes are situations in which the dimensions of the constrained space associated with the undeployed state render other approaches problematic. For instance, a structure in which an antenna array structure is implemented with a flexible membrane can more readily occupy a dimensionally irregular space than an antenna array structure implemented with a plurality of hinged rectangular solar panels.

With respect to spacecraft structures that employ flexible membranes to realize large dimensional structures such as solar sails, antennas, solar arrays, heat shields, de-orbiters and the like, the deployment mechanisms employed in these structures have taken various forms. For instance, U.S. Pat. No. 3,530,460 discloses the use of telescoping rods to transition a reflector from an undeployed state to a deployed state. Another deployment mechanism utilizes inflatable tubes to transition a sheet that supports solar cells from an undeployed state to a deployed state. See U.S. Pat. No. 6,568,640.

SUMMARY OF THE INVENTION

The present invention is a thin membrane structure for stabilizing a spacecraft. The spacecraft has a first end and a second end. The spacecraft has a center of pressure and a center of gravity. The thin membrane structure comprises a module secured to the spacecraft and a structure having a polygonal base and a plurality of triangular side panels meeting in a point opposite the base with the point secured to the module. Prior to deployment, the structure is entirely contained within the module. Subsequent to deployment, the structure expands to a pyramidal shape with the distance between the center of pressure and the center of gravity increasing to a length greater than approximately one-half the length of the spacecraft.

In addition, the present invention includes a method for stabilizing a spacecraft. The spacecraft has a first end and a second end. The spacecraft has a center of pressure and a center of gravity. The method comprises securing a module to the spacecraft, providing a structure having a polygonal base and a plurality of triangular side panels meeting in a point opposite the base, securing the point to the module, containing the entire structure within the module prior to deployment, expanding the structure to a pyramidal shape subsequent to deployment, and increasing the distance between the center of pressure and the center of gravity to a length greater than approximately one-half the length of the spacecraft.

The present invention further includes a thin membrane structure for stabilizing a spacecraft. The spacecraft has a first end and a second end. The spacecraft has a center of pressure and a center of gravity. The thin membrane structure comprises a module secured to the spacecraft and a structure having a polygonal base and four triangular side panels. Each side panel has a top point, a first base point, and a second base point with the side panels meeting at the top points opposite the base. The top points are secured to the module. A plurality of pantographs extend between each of the side panels with each of the pantographs having an attached end attached to the module and a free end secured to the base points of the side panels. Prior to deployment, the structure and the pantographs are entirely contained within the module. Subsequent to deployment, the structure and pantographs expand to a pyramidal shape with the distance between the center of pressure and the center of gravity increasing to a length greater than approximately one-half the length of the spacecraft.

In another embodiment, a deployable thin membrane structure is provided that includes a flexible membrane structure and a deployment mechanism for transitioning the membrane from an undeployed state towards a deployed state. The deployment mechanism includes a plurality of pantographs or scissor mechanisms with each pantograph being associated with a particular portion of the flexible membrane and used to displace the membrane in the transition from the undeployed state towards the deployed state. The deployment mechanism also includes a guide that cooperates with the pantographs to coordinate the transition of the pantographs from the undeployed state toward the deployed state. In a particular embodiment, the guide includes a disk that is rotatable about an axis. With respect to each of the pantographs, (a) the proximal end of one arm is pivotally connected to the disk (the distal end of the arm is connected to the membrane) and (b) the proximal end of the other arm is pivotally connected to a base at a location that is fixed relative to the axis of rotation of the disk (the distal end of the other arm is connected to the membrane). When the disk rotates such that the proximal ends of the two arms of each of pantographs approach one another, the pantographs and the membrane transition from the undeployed state towards the deployed state. Because one arm of each of the pantographs is pivotally connected to the disk, rotation of the disk causes each of the pantographs to substantially simultaneously begin transitioning from the undeployed state towards the deployed state. It is believed that the simultaneous deployment of the pantographs reduces the possibility of the membrane binding or fouling in a manner that would prevent substantially complete deployment of the membrane in to a form capable of providing a spacecraft with a desired functionality.

In one embodiment, the energy source for causing the rotation of the disk is provided by a spring system. The spring system can take a number of forms. In one embodiment, the spring system includes a torsion spring that operatively extends between the disk and the base. In another embodiment, the spring system includes a spring that is associated with a pivot point associated with at one of the pantographs. In a particular embodiment, the spring system includes a number of springs with each spring associated with a pivot point of a pantograph and, in a preferred embodiment, with a center pivot point of a pantograph (as opposed to an edge pivot point of the pantograph). In yet another embodiment, the spring system includes one or more springs associated with each of the plurality of pantographs. Other sources of energy can be employed, including electric motors and hydraulic/pneumatic type motors.

In another embodiment, a deployable thin membrane structure is provided that includes a flexible membrane structure and a deployment mechanism for transitioning the membrane from an undeployed state towards a deployed state. The deployment mechanism includes a pantograph or scissor mechanism that is used to displace the membrane in the transition from the undeployed state towards the deployed state. The deployment mechanism further includes a guide that engages with the pantograph causes the ends of the arms of the pantograph to move towards one another along a curved path. In a particular embodiment, the guide is a rotor that is adapted to rotate about an axis. The proximal end of one arm of the pantograph is pivotally connected to the rotor and the proximal end of the other arm of the pantograph is pivotally connected to a located that is fixed relative to the axis. During rotation of the rotor, the end of the arm pivotally connected to the rotor moves towards the end of the other arm that is fixed relative to the axis along a circular arc.

BRIEF DESCRIPTION OF THE DRAWINGS

FIG. 1 is a perspective view illustrating a module holding a thin membrane structure, constructed in accordance with the present invention, prior to deployment;

FIG. 2 is a series of perspective views illustrating the deployment sequence for the thin membrane structure, constructed in accordance with the present invention;

FIG. 3 is a perspective view illustrating the thin membrane structure, constructed in accordance with the present invention, subsequent to deployment;

FIG. 4 is a bottom view illustrating the thin membrane structure, constructed in accordance with the present invention, subsequent to deployment;

FIG. 5 is an elevational side view illustrating the thin membrane structure, constructed in accordance with the present invention, subsequent to deployment;

FIG. 6 is perspective view illustrating one of the membranes of the thin membrane structure, constructed in accordance with the present invention;

FIG. 7 is a perspective view illustrating a pantograph interface of one of the membranes of the thin membrane structure, constructed in accordance with the present invention;

FIG. 8 is a perspective view illustrating a module interface of one of the membranes of the thin membrane structure, constructed in accordance with the present invention;

FIG. 16 is a series of perspective views illustrating the root pantograph sequencer mechanism as it deploys thin membrane structure, constructed in accordance with the present invention;

DETAILED DESCRIPTION

Figure 5A:
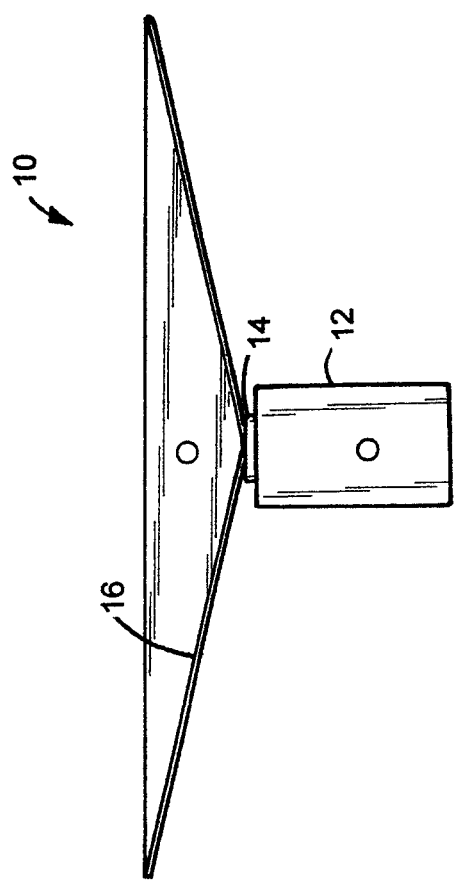
FIG. 5a is a schematic side view illustrating the thin membrane structure, constructed in accordance with the present invention, subsequent to deployment.
Figure 9:
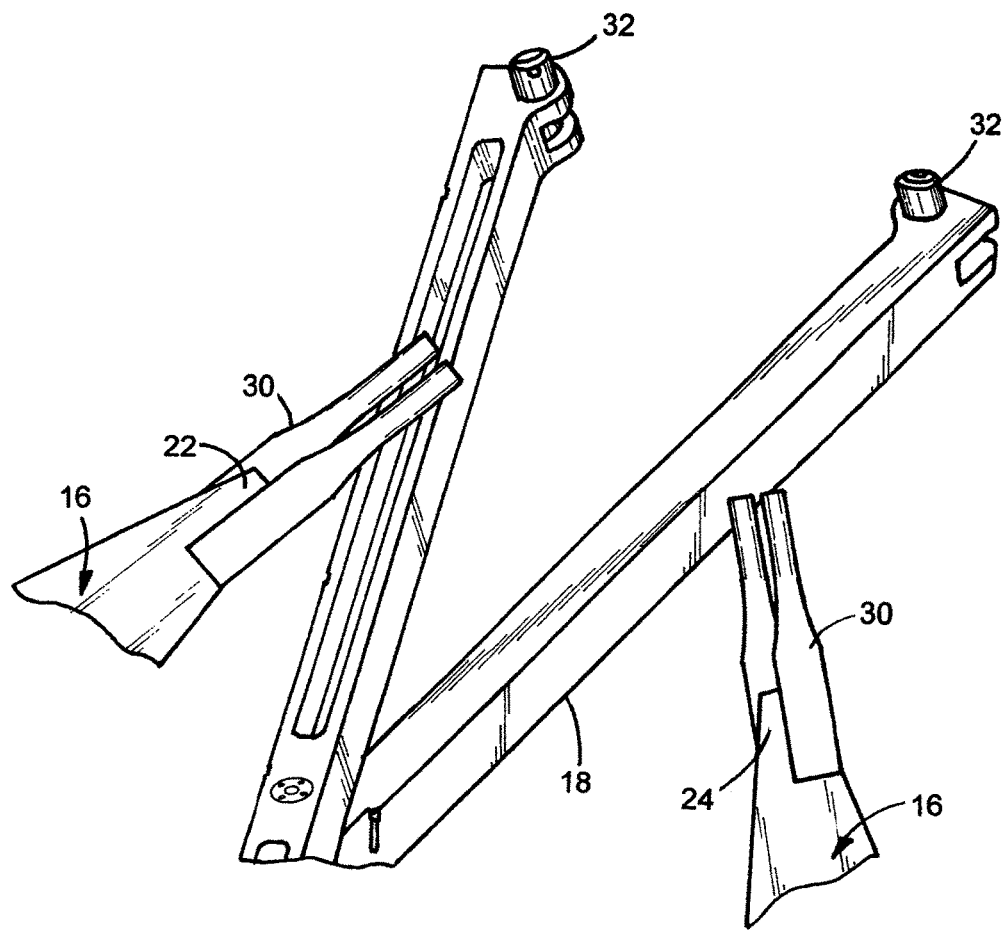
FIG. 9 is a perspective view illustrating the pantograph interface of two adjacent membranes of the thin membrane structure, constructed in accordance with the present invention.
Figure 10:
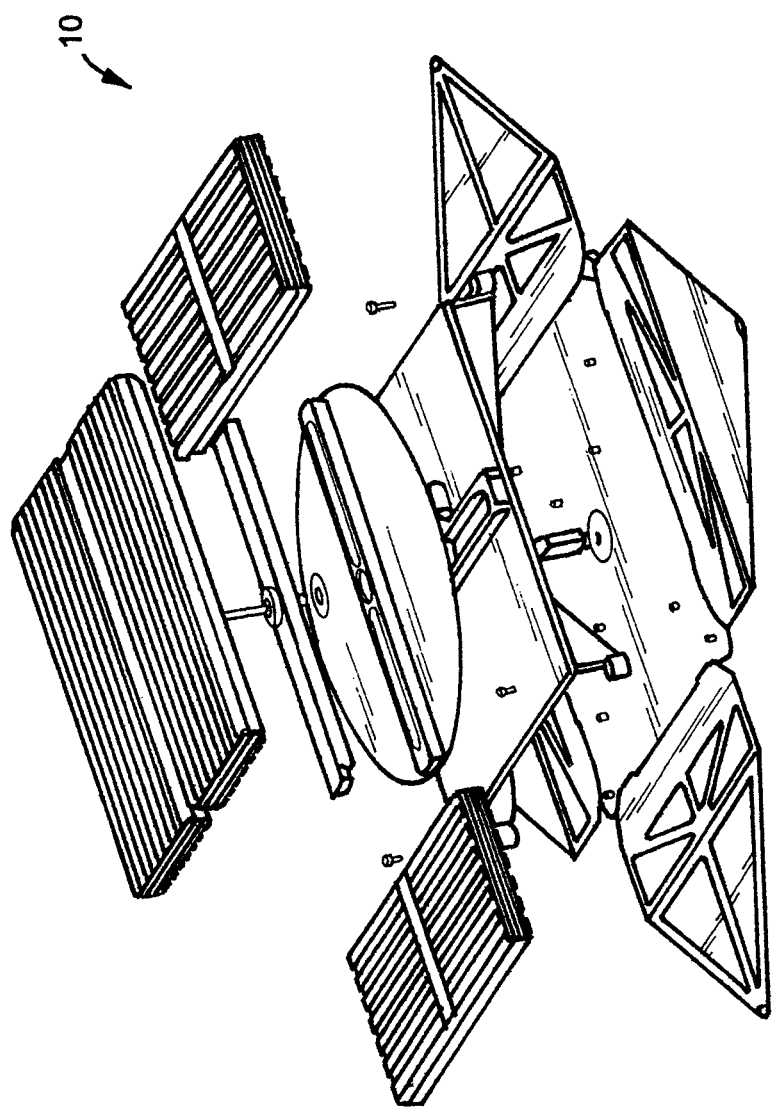
FIG. 10 is an exploded perspective view illustrating the module subassemblies of the module holding the thin membrane structure, constructed in accordance with the present invention.
Figure 11:
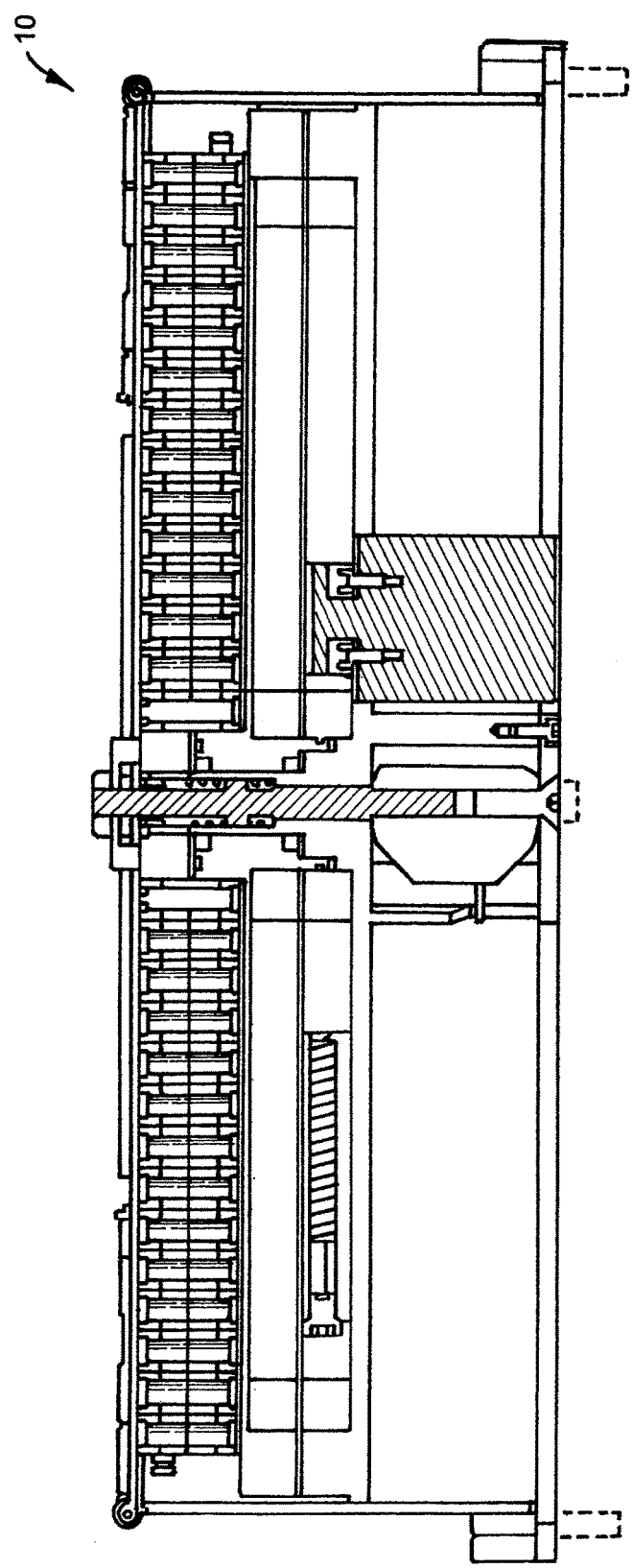
FIG. 11 is a sectional view illustrating the module of the thin membrane structure, constructed in accordance with the present invention.
Figure 12:
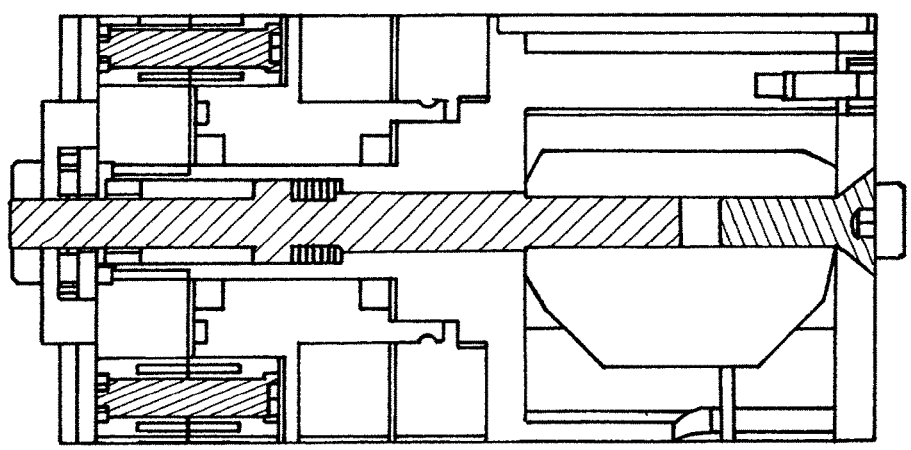
FIG. 12 is a sectional view illustrating a launch restraint of the thin membrane structure, constructed in accordance with the present invention, in a restrained condition.
Figure 13:
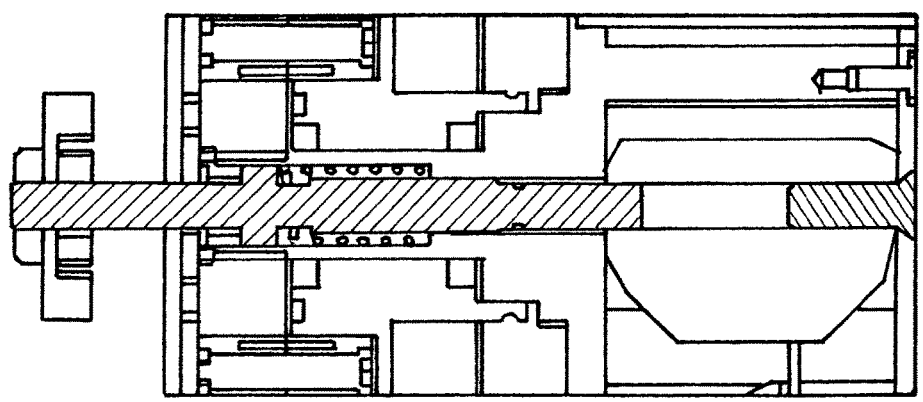
FIG. 13 is a sectional view illustrating the launch restraint of the thin membrane structure, constructed in accordance with the present invention, in a released position.
Figure 14:
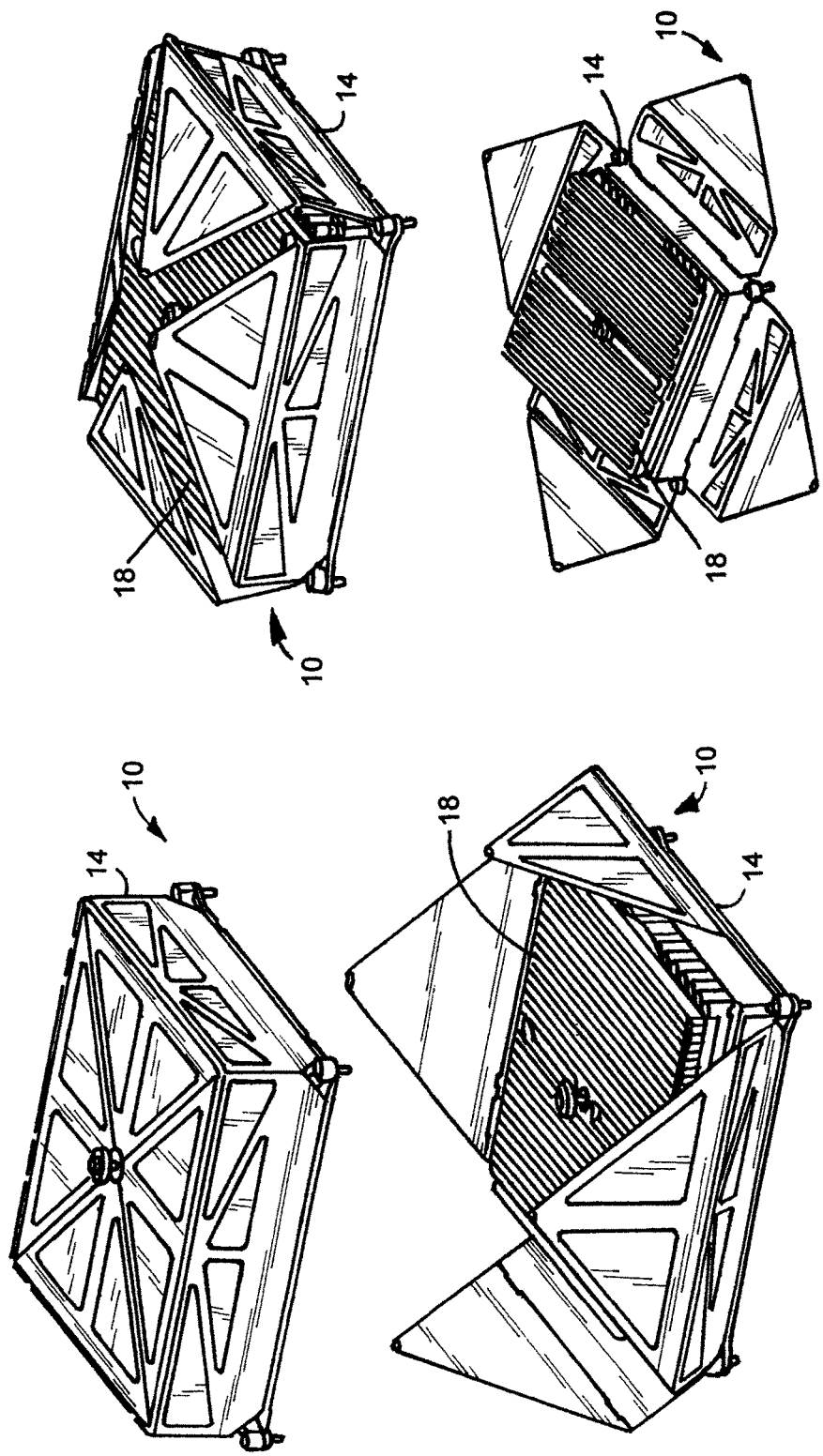
FIG. 14 is a series of perspective views illustrating the launch restraint sequence for deploying the thin membrane structure, constructed in accordance with the present invention.
Figure 15A:
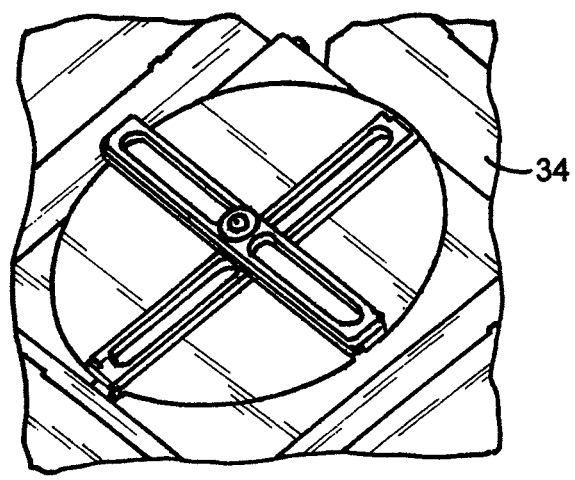
FIGS. 15a and 15b are perspective views illustrating the root pantograph sequencer mechanism for deploying the thin membrane structure, constructed in accordance with the present invention.
Figure 15B:
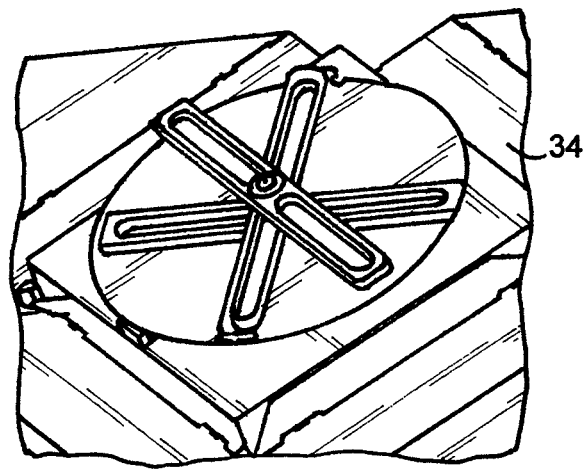
Figure 17:
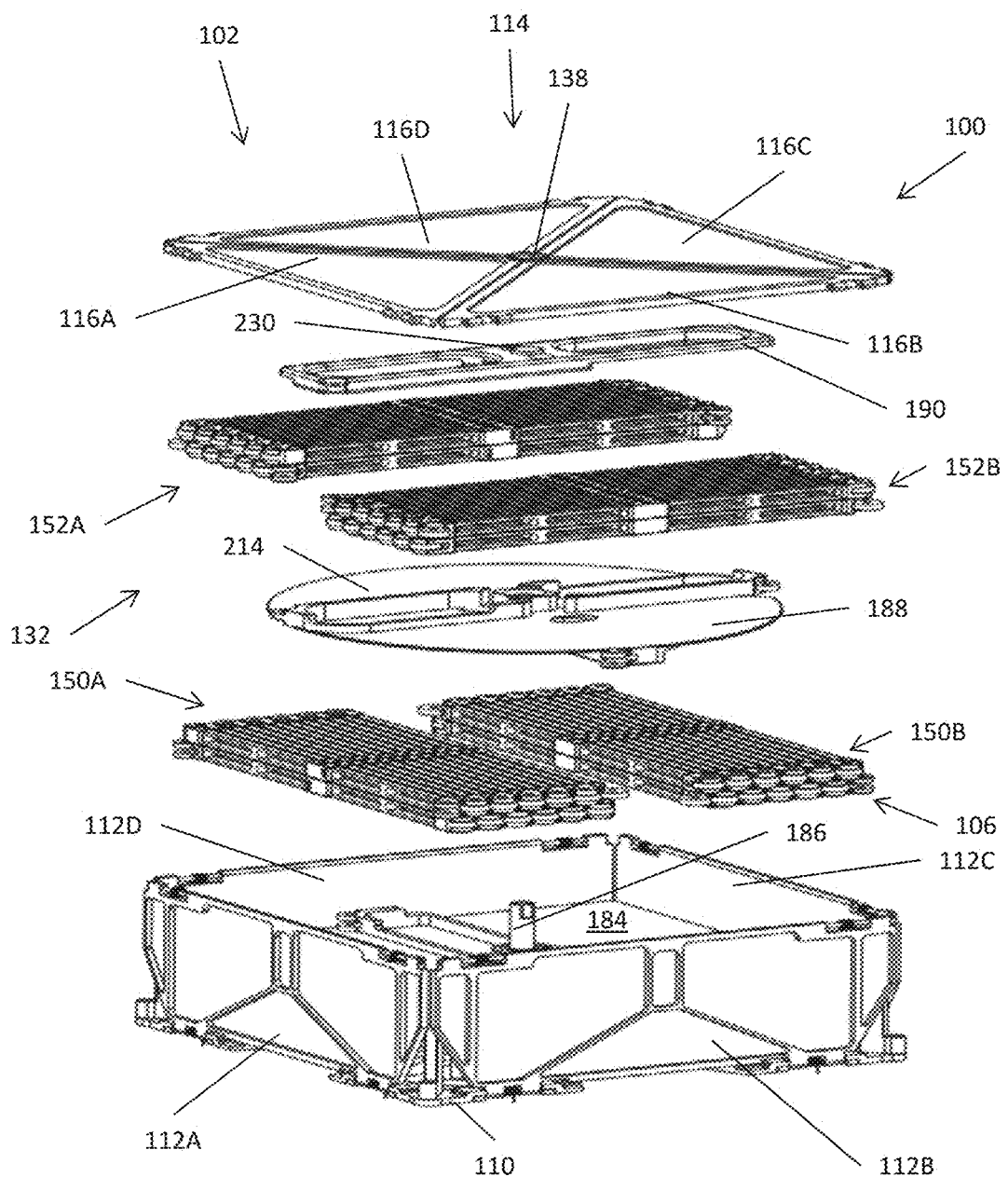
FIG. 17 illustrates an exploded view of a second embodiment of a deployable thin membrane apparatus.
Figure 18:
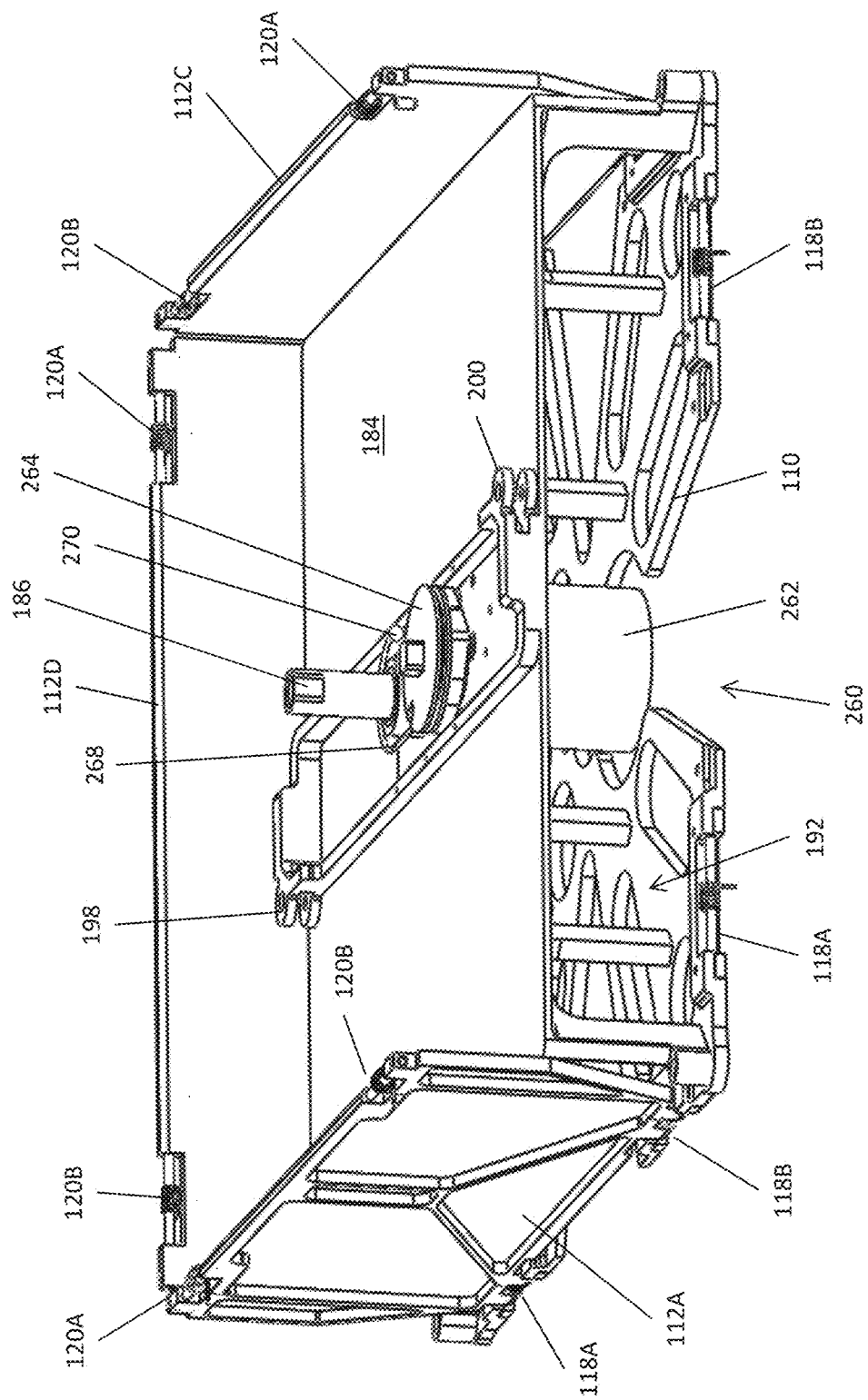
FIG. 18 is a perspective view of a portion of the housing and a portion of the deployment mechanism of the embodiment of the apparatus illustrated in FIG. 17.
Figure 19:
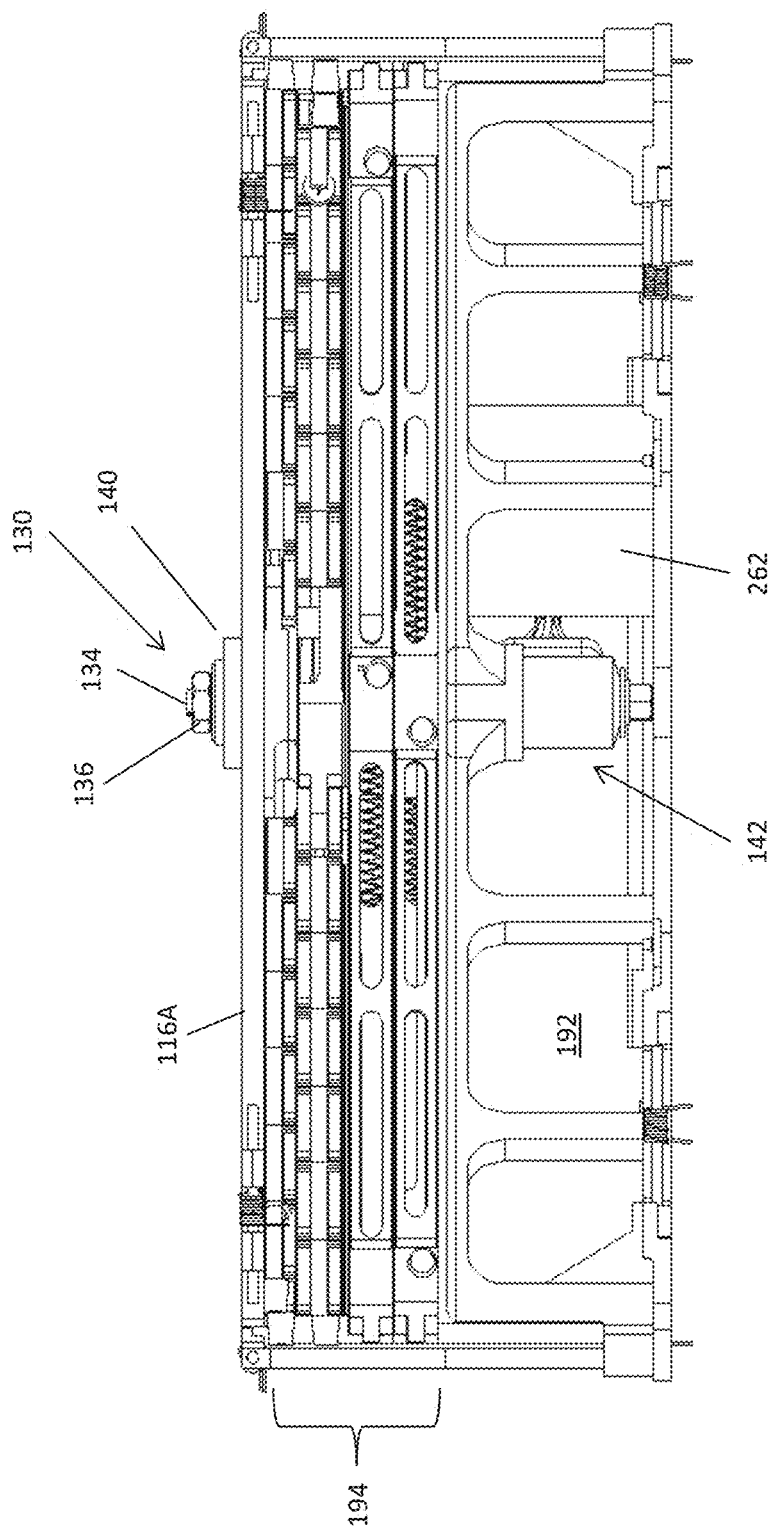
FIG. 19 is a side view of the apparatus illustrated in FIG. 17 in an undeployed state and with a side panel removed.
Figure 20A:
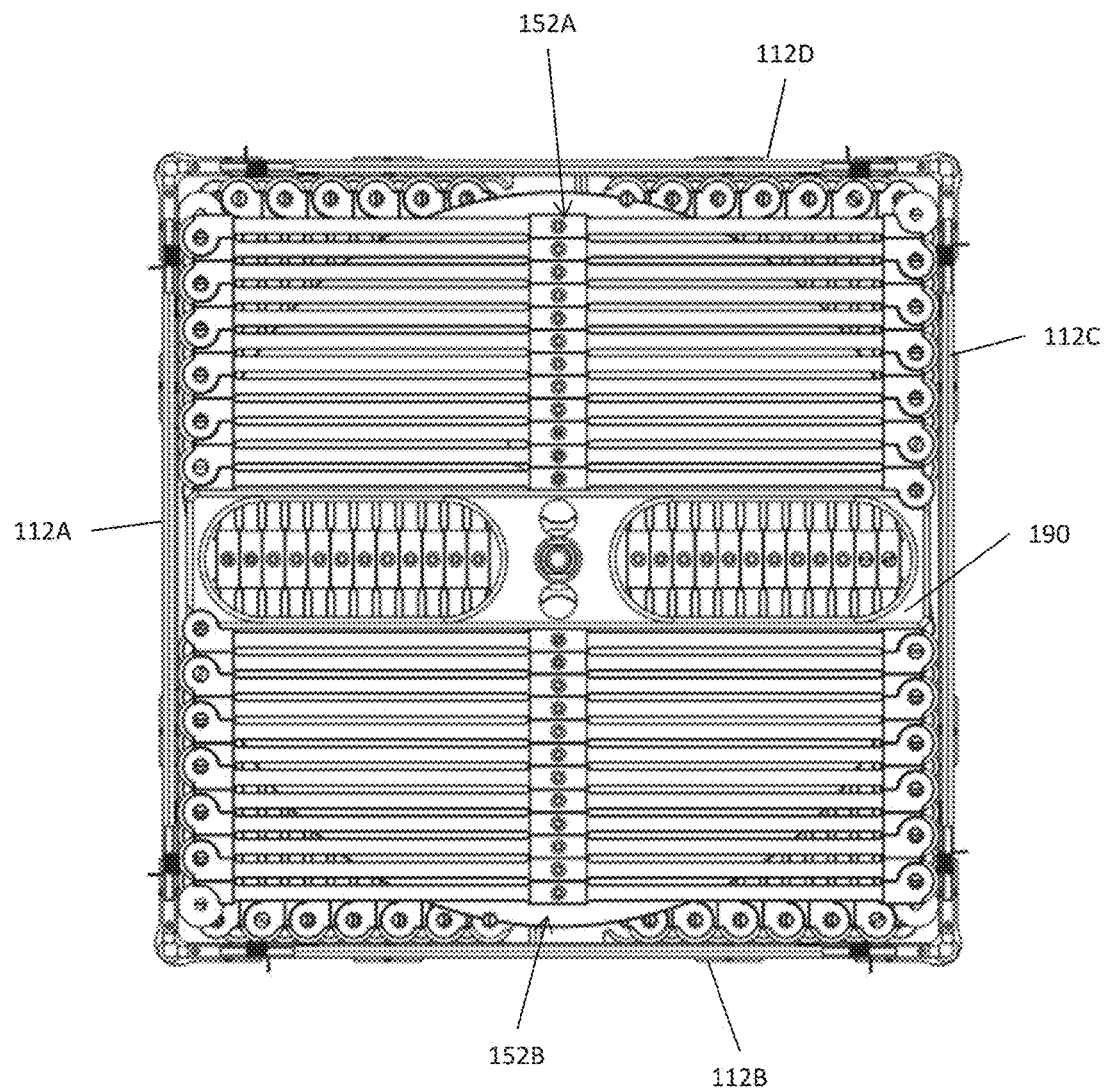
FIG. 20A is a plan view of the apparatus illustrated in FIG. 17 with the top panel removed.
Figure 20B:
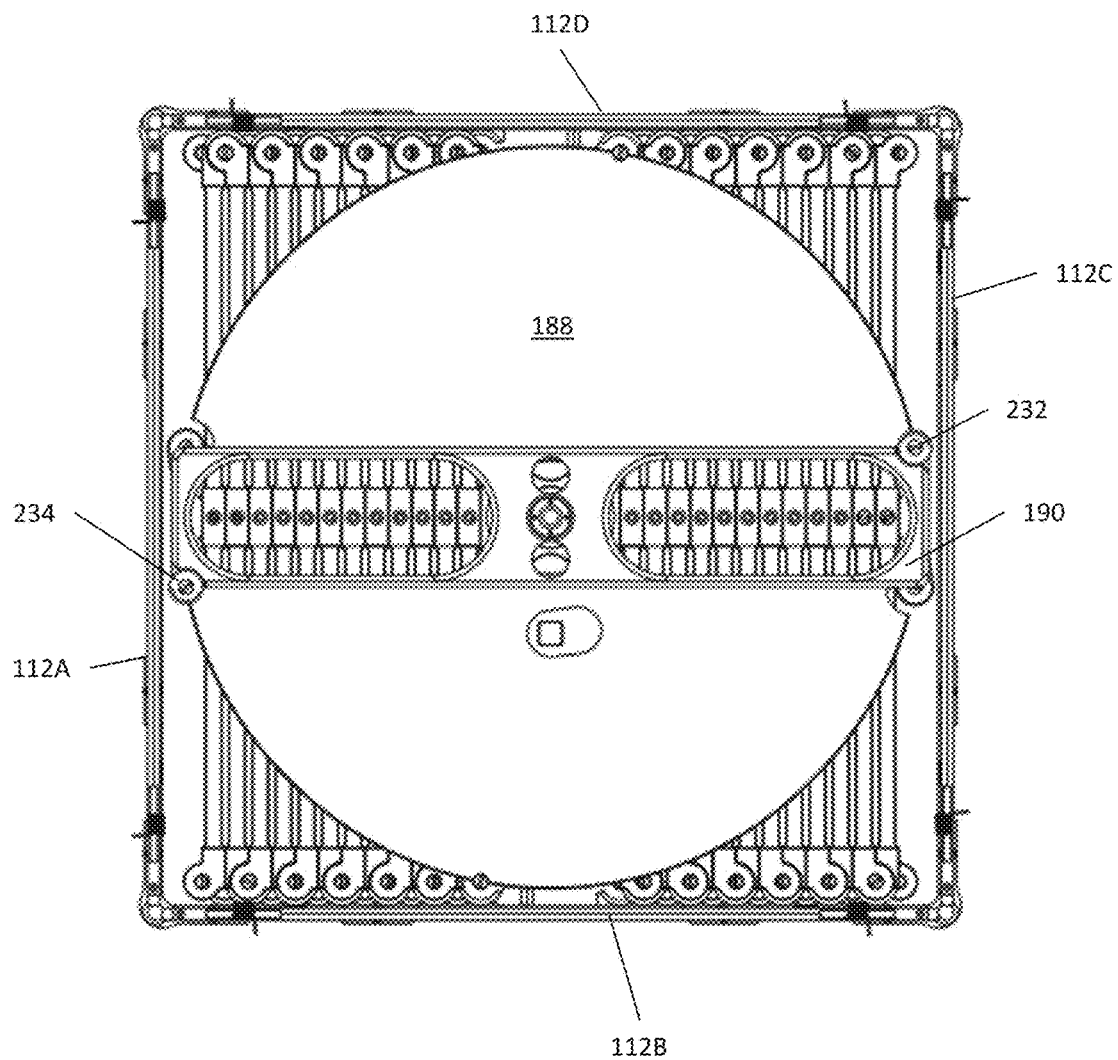
FIG. 20B is a plan view of the apparatus illustrated in FIG. 17 with the top panel and the two upper pantographs removed.
Figure 20C:
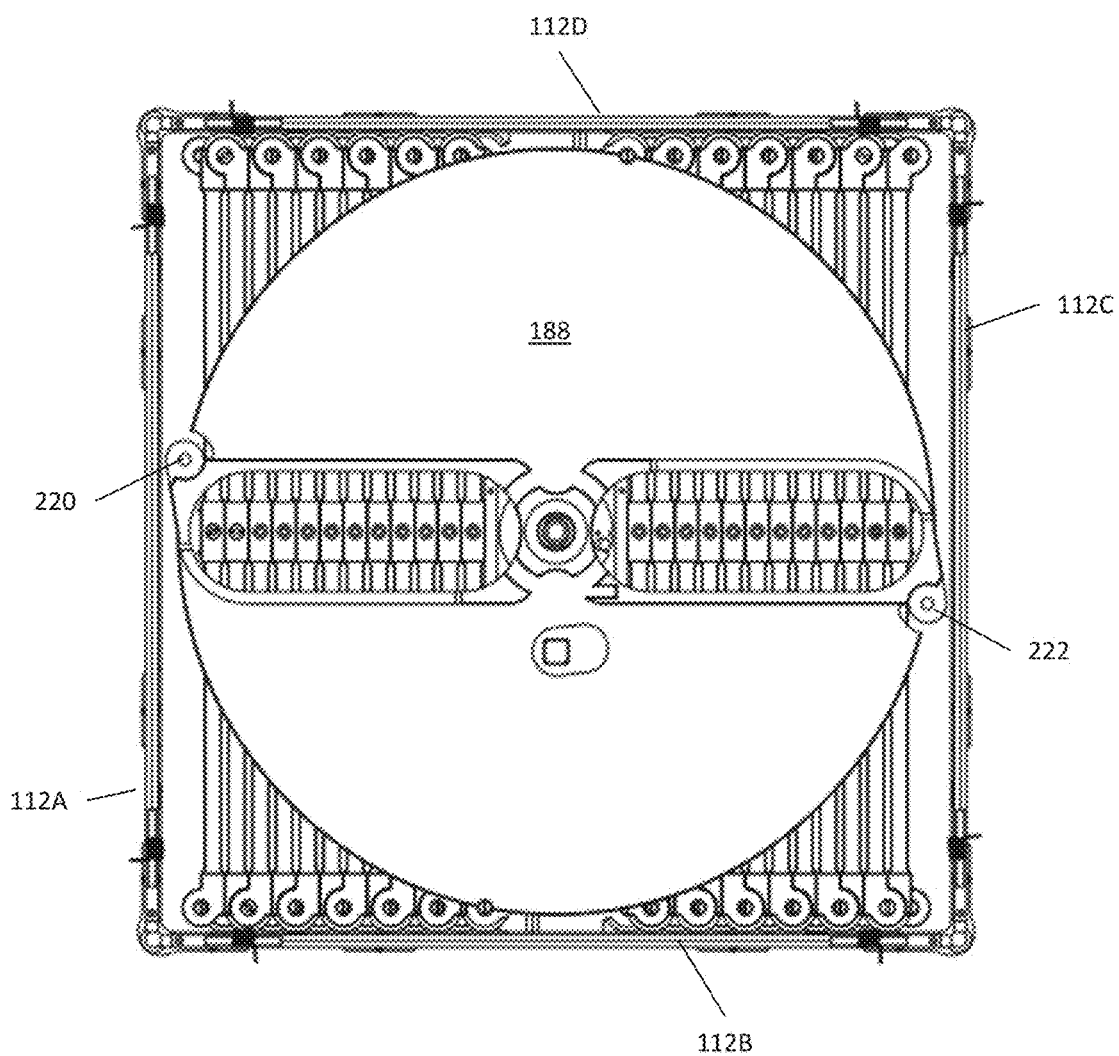
FIG. 20C is a plan view of the apparatus illustrated in FIG. 17 with the top panel, two upper pantographs, and upper pantograph plate removed.
Figure 20D:
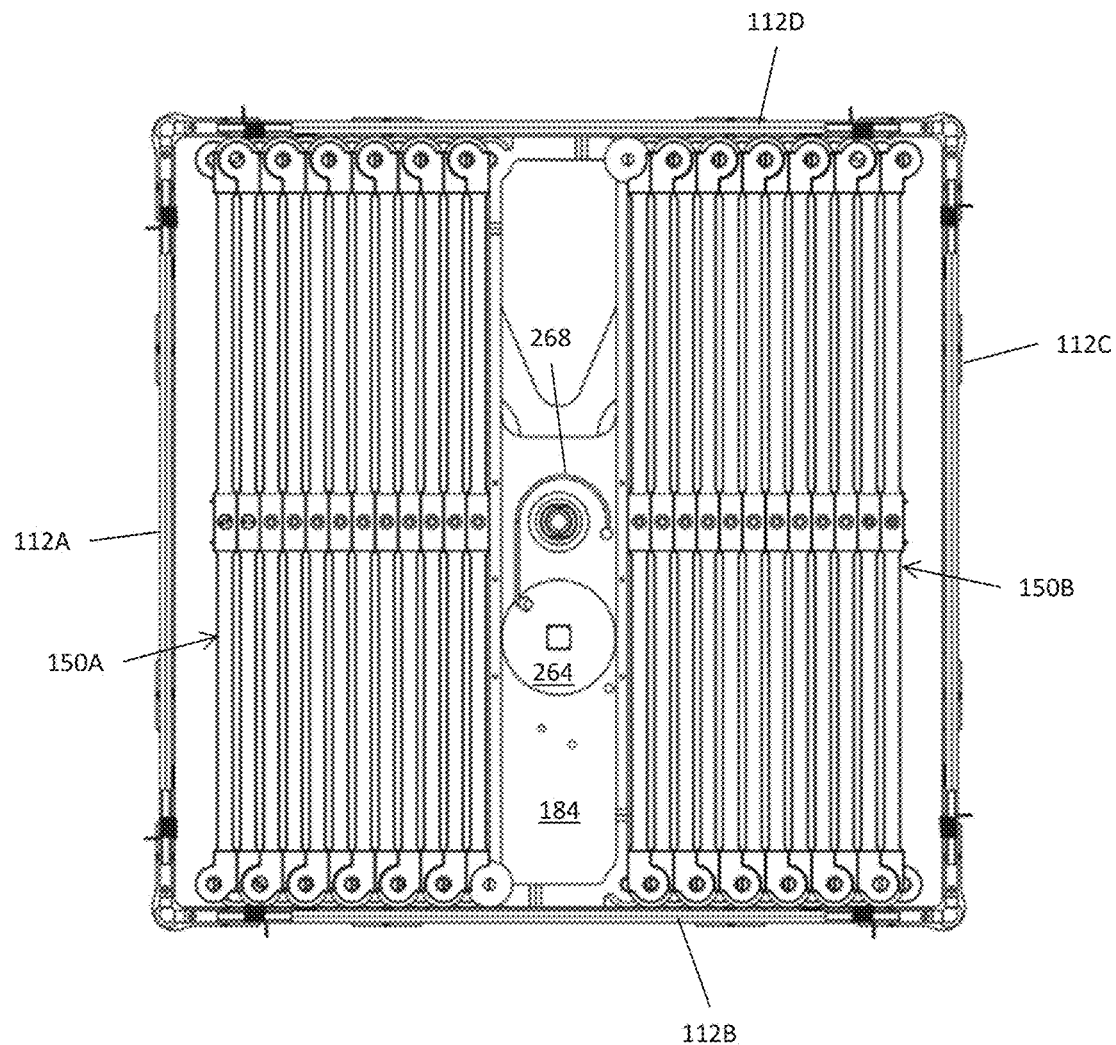
FIG. 20D is a plan view of the apparatus illustrated in FIG. 17 with the top panel, two upper pantographs, upper pantograph plate, and mid-pantograph plate removed.
Figure 20E:
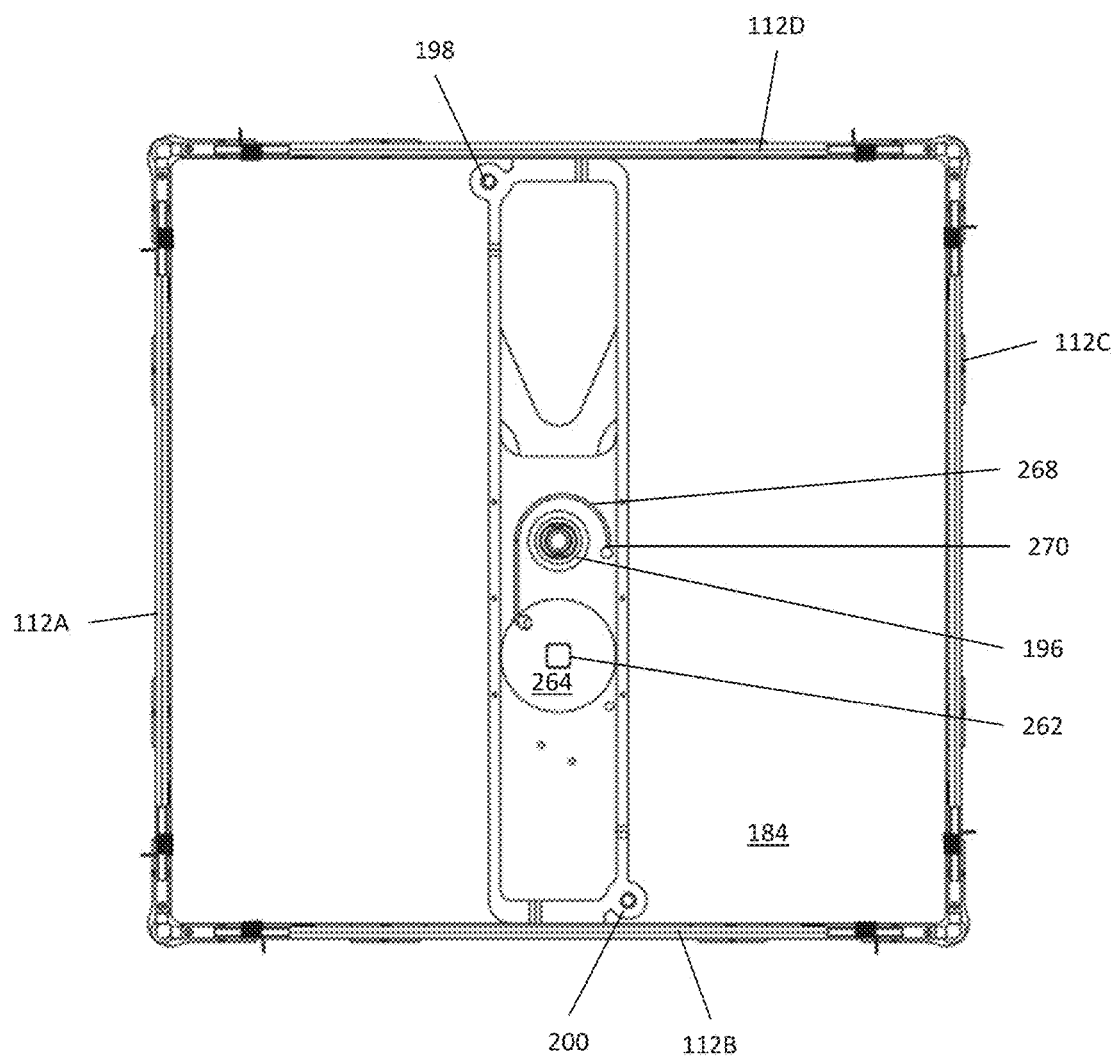
FIG. 20E is a plan view of the apparatus illustrated in FIG. 17 with the top panel, two upper pantographs, upper pantograph plate, mid-pantograph plate, and two lower pantographs removed.

As illustrated in FIGS. 1-16, the present invention is a thin membrane structure, indicated generally at 10, for increasing spacecraft 12 stability that when deployed, increases the distance between the center of gravity and center of pressure thereby increasing the spacecraft 12 stability. The thin membrane structure 10 is preferably stored in a module 14 mounted at an end of the spacecraft 12.

The thin membrane structure 10 of the present invention comprises a plurality of membrane panels 16 secured to an equal number of pantographs 18. Preferably, there are four triangular membrane panels 16 each having a top point 20, a first base point 22, and a second base point 24. The top point 20 preferably has a strengthening layer 26 secured to the membrane panel 16 with a clamp bar 28 and a plurality of fastening mechanisms 29 although securing the strengthening layer 26 to the membrane panel 16 by other means is within the scope of the present invention. Each pantograph extends between adjacent membrane panels 16, each membrane panel being stored in folded condition in a chamber defined by walls 40A, 40B and an outer wall of the module 14.

The first base point 22 and the second base point 24 of the membrane panel 16 of the thin membrane structure 10 of the present invention has a pair of flanges 30 extending therefrom with each flange 30 having a grommet 31 secured therethrough. The flanges 30 are secured to the free end of the pantographs 18 with a pin 32 extending through the grommets thereby securing the first base point 22 of one of the membrane panels 16 adjacent to the second base point 24 of an adjacent membrane panel. As the pantographs 18 expand, they expand the membrane panels 16 creating a pyramidal form with each of the membrane panels 16 forming one of the pyramid sides. It is important to support each membrane panel 16 between adjacent membrane panels 16 along the pyramid sides thereby inhibiting collapse of the pyramidal structure.

Typical deployable structures are flat and not prism shaped thereby positioning the center of pressure right at the front of the spacecraft and fairly close to the center of gravity. The further the center of gravity is from the center of pressure, the greater the spacecraft 12 stability. The pyramidal shape of the thin membrane structure 10 of the present invention positions the center of pressure two-thirds of the depth of the spacecraft structure 12 providing a large increase in distance between the center of pressure and the center of gravity. The center of pressure is moved to a point beyond the top of the spacecraft 12.

Basically, the thin membrane structure 10 of the present invention provides a pyramidal thin membrane or "blanket" structure usable for multiple purposes (i.e., de-orbit, solar sail, solar cell, etc.) that increase spacecraft stability upon deployment due to a formed prism shape. The prism is a four-sided pyramid with a rectangular base and triangular sides. The pyramidal shape of the thin membrane structure 10 moves the center of pressure of the spacecraft 12 away from the center of gravity increasing the stability of a spacecraft 12.

The pantographs 18 of the thin membrane structure 10 of the present invention can be of any style or type. Preferably, the pantographs 18 and the deployment of the pantographs 18 are best illustrated in FIGS. 10-16 together with root sequencer mechanism 34 for easily and efficiently deploying the thin membrane structure 10.

For an example of an application of the thin membrane structure 10 of the present invention, consider a de-orbit deployable structure. These structures are flat once deployed. An embodiment of the present invention is pyramidal in shape creating the center of pressure to shift from the face of the structure to ⅔ of the distance of the depth of the pyramidal shape.

An embodiment of the thin membrane structure 10 of the present invention includes four pantographs 18 or similar self-deploying structure, to be used for deployment and structure of the thin membrane panels 16. Deployment is initiated from a release mechanism 36 that operates to move a switch 38 from a "closed" state in which the switch 38 prevents the lid of the module 14 from opening (see FIGS. 1, 11, 12, and 14) to an "open" state in which the switch 38 allows the lid of the module 14 to open such that the membrane panels 16 can be transitioned from a folded state to an unfolded state with a pyramidal shape (see FIGS. 2 and 14). The thin membrane structure 10 is stowed on top of the deployable structure mechanism. The membrane panels 16 unfurl as the pantographs 18 (or other structure) deploy and takes a pyramidal shape when it is fully deployed.

In an embodiment, the thin membrane structure 10 of the present invention is deployed and supported by a structure that is used for deployment and support once deployed. The membranes and supporting/deploying structure are stowed and preloaded by a launch tie while the spacecraft is launched. Once the membrane panels 16 and supporting/deploying structure is needed per mission requirements, a signal is sent to the launch tie allowing the support structure/deploying mechanism to release and unfurl the membrane panels until a fully deployed structure shaped like a pyramid is completed.

With reference to FIGS. 17-22, a second embodiment of a deployable thin membrane apparatus that is capable of deploying a thin membrane structure that can be used to enhance the stability of a spacecraft (hereinafter apparatus 100) is described. Generally, the apparatus 100 comprises: (a) a housing 102 for storing substantial portions of a flexible thin membrane structure and the deployment mechanism when the structure and mechanism are each in an undeployed state and supporting the flexible thin membrane structure and deployment mechanism when the structure and mechanism are each in an deployed state, (b) a flexible thin membrane structure 104 (see FIG. 4), (c) a deployment mechanism 106 for transitioning the flexible thin membrane structure 104 from an undeployed state to a deployed state.

The housing 102 includes a base 110, side panels 112A-112D, and a top panel 114. The top panel 114 comprises triangular panels 116A-116D. The base 110 is connected to the each of side panels 112A-112D by a pair of spring-biased hinges 118A, 118B. Each of the side panels 112A-112D is connected to a corresponding one of the triangular panel 116A-116D by a pair of spring-biased hinges 120A, 120B. When the housing 102 is in the undeployed state (See FIG. 1), the base 110, side panels 112A-112D, and triangular panel 116A-116D define an enclosed space that stores the flexible thin membrane structure 104 and a substantial portion of the deployment mechanism 106. When the housing is in the undeployed state, the springs associated with each of the spring-biased hinges 118A, 118B extending between the base 110 and the side panels 112A, 112D and the spring-biased hinges 120A, 120B extending between each of the side panels 112A-112B and a corresponding one of the triangular panels 116A-116D store potential energy that is used to transition the housing from the undeployed state towards a deployed state in which the base 110, side panels 112A-112D, and triangular panels 116A-116D are disposed so as reduce the possibility of the panels interfering with the transitioning of the flexible thin membrane structure 104 from an undeployed state towards a deployed state. More specifically, the springs bias the side panels 112A-112D and triangular panels 116A-116D such that in the deployed state the base 110, side panels 112A-112D, and triangular panels 116A-116D have a roughly planar configuration. See FIG. 2. A fastener associated with the deployment mechanism is used to maintain the housing in the undeployed state and released to allow the housing 104 to transition from the undeployed state towards the deployed state. It should be appreciated that many other housing structures that are capable of storing a flexible thin membrane structure and all or a substantial portion of a deployment structure are feasible.

The flexible thin membrane structure 104 comprises the four flexible panels 16A-16D (See FIG. 4). The top point 20 of each of the flexible panels 16A-16D is operatively attached to the housing 104 and the first and second base points 22, 24 of each of the flexible panels 16A-16D is operatively attached to the deployment mechanism 106. Each of the panels 16A-16D possesses sufficient flexibility to allow the panel to be folded so as to reside in a portion of a panel space at least partially defined by the housing 102 when the housing is in the undeployed state. The panels 16A-16D, when in the deployed state, form a four-sided pyramid-like structure. (See FIG. 5). The four-sided pyramid-like structure, if appropriately situated on a spacecraft, is capable of providing a stabilizing function. Alternatively or additionally, the four-sided pyramid-like structure can be adapted for a number of purposes. For instance, the structure can be adapted to function as a solar sail, a reflector, a portion of an antenna, or a solar array to name a few. It should be appreciated that three-sided and more than four-sided pyramid like structures are feasible, if needed or desired for a particular application. With respect to apparatus 100, the box-like nature of the housing 102 naturally lends itself to a flexible thin film membrane structure comprised of four flexible panels 16A-16D. It should also be appreciated that the edges of the panels that are adjacent to one another are not directly joined to one another. However, a thin film membrane structure that is a single piece is feasible. For instance, a four-sided pyramid-like structure can be realized with four panels that are joined to one another so as to form a single-piece structure. Further, a pyramid structure of n-sides can be realized with n-panels, a single-piece (i.e., a single-piece structure, or some number of pieces that is greater than a single-piece but less than n-pieces.

Generally, the deployment mechanism 106 includes: (a) a fastener 130 for use in transitioning the housing 102 from the undeployed state to the deployed state and (b) a pantograph system 132 for moving the flexible thin membrane structure 104 between from the undeployed state towards the deployed state. The fastener 130 includes: (a) a frangible bolt 134 that has a head 136 and a body that extends through a hole 138 defined by the triangular panels 116A-116D and into the interior of the housing 102 when the housing is in the undeployed state, (b) a washer 140 disposed between the head 136 of the bolt and the triangular panels 116A-116D when the housing is in the undeployed state, and (c) a bolt actuator 142 that maintains the position of the head 136 of the bolt and the washer 140 adjacent to the triangular panels 116A-116D when the housing is in the undeployed state and positions the head 136 of the bolt and washer 140 a sufficient distance away from the triangular panels 116A-116D to facilitate the transition of the housing 102 from the undeployed state towards the deployed state. More specifically, the bolt actuator 142 includes a shape memory alloy cylinder that, when heated by the application of electricity to a heating circuit, causes the bolt 134 to fracture. Once the bolt is fractured, a spring then applies a force to the portion of the fractured bolt that includes the head 136 such that the portion of the bolt that include the head 136 and the washer 140 are displaced away from the base 110 of the housing 102. As the head 136 of the bolt and washer 140 are moved away from the base 110, each of the four pairs of springs 118A, 118B and each of the four pairs of springs 120A, 120B operates to transition the housing 102 from the deployed state to towards the undeployed state. In the illustrated embodiment, the fastener 130 includes a Tini Aerospace FC2 Frangibolt® device.

Figure 21:
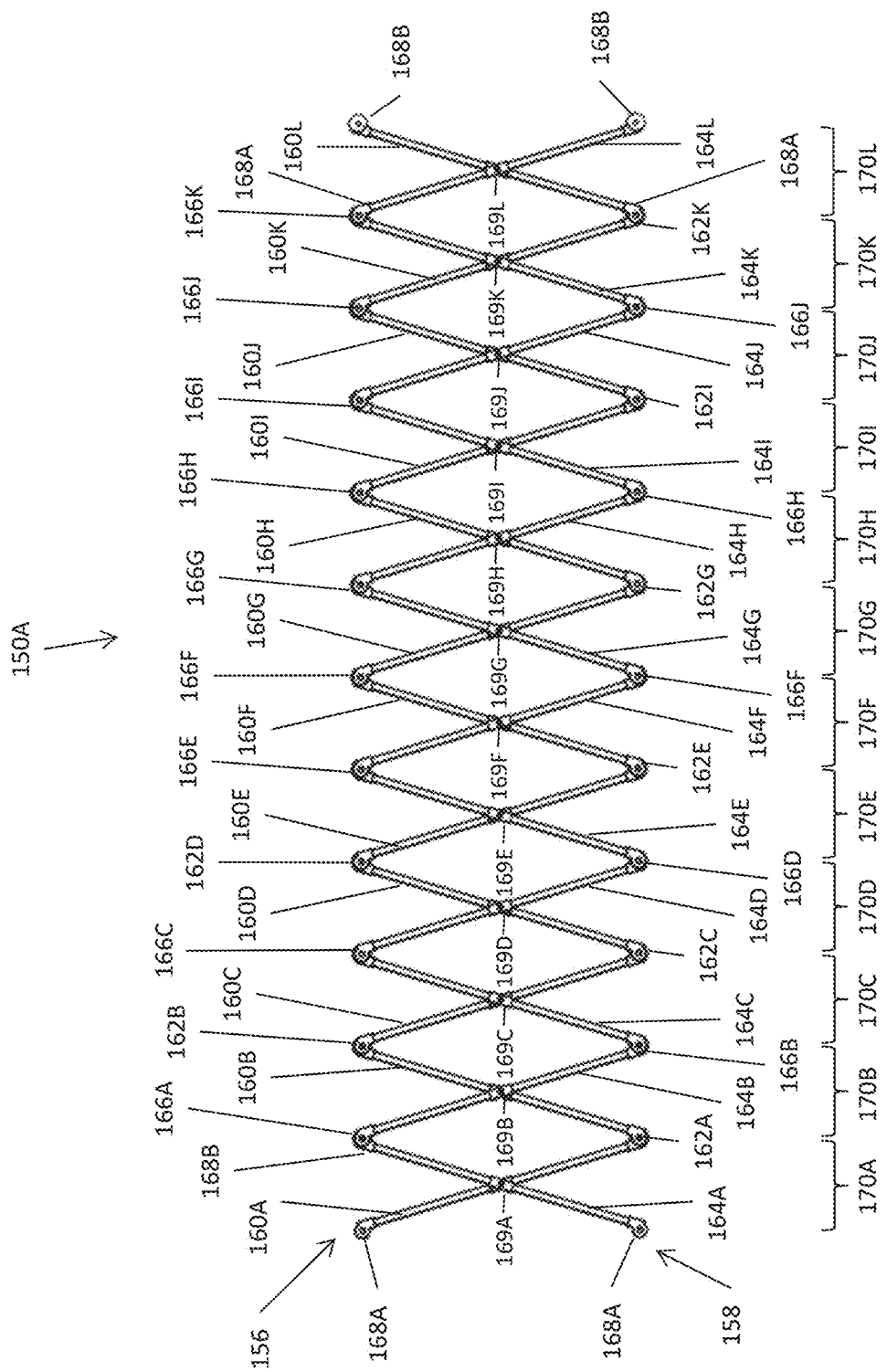
FIG. 21 is a plan view of one of the two lower pantographs of the apparatus illustrated in FIG. 17.
Figure 22:
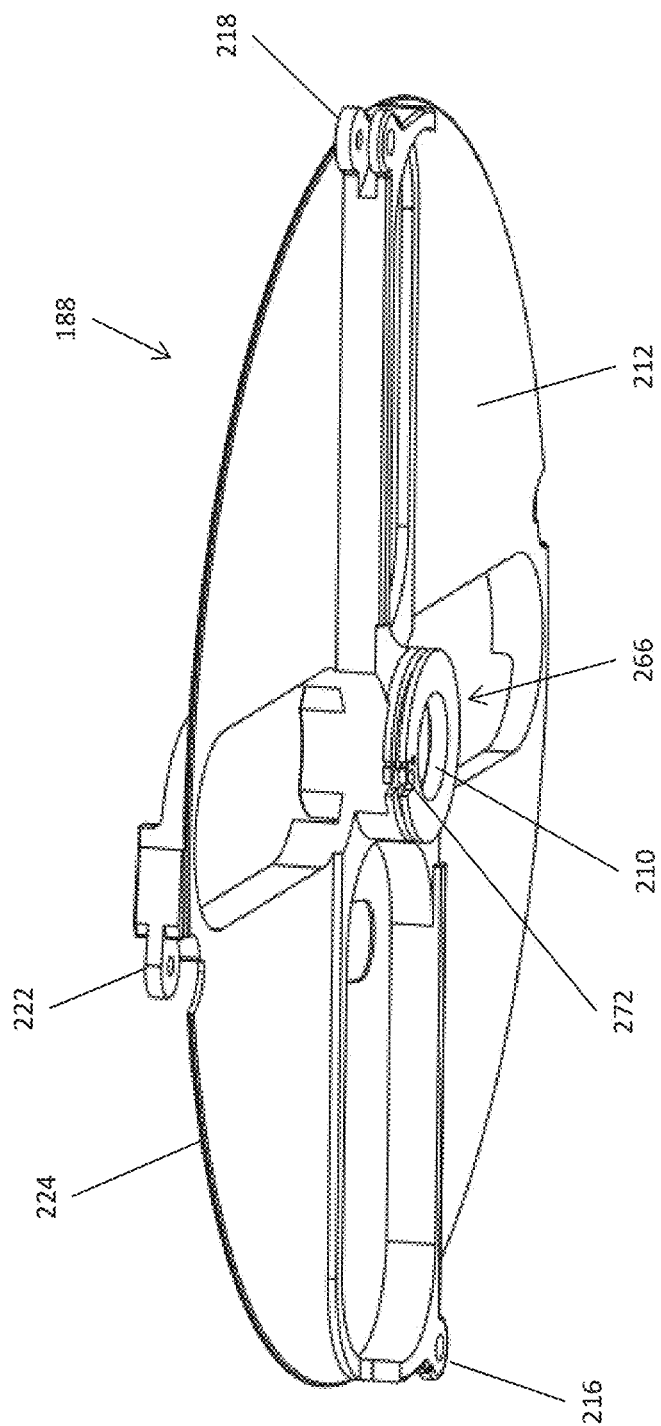
FIG. 22 is a perspective view of the mid-pantograph plate of the apparatus illustrated in FIG. 17.

The pantograph system 132 includes two lower pantographs 150A-150B, two upper pantographs 152A-152B, and a pantograph actuator. With reference to FIG. 21, the pantograph 150A is described with the understanding that pantographs 150B, 152A, and 152B are substantially identical to pantograph 150A. The pantograph 150A includes a first arm 156 and a second arm 158. The first arm 156 comprises first links 160A-160L with the links pivotally connected to one another at first outside pivot joints 162A-162K. The second arm 158 comprises second links 164A-164L with the links pivotally connected to one another at second outside pivot joints 166A-166K. Each of the links 160A-160L and 164A-164L extends from a proximal end 168A to a distal end 168B. The first arm 156 and second arm 158 are pivotally connected to one another at center pivot joints 169A-169L. The pantograph 150A includes twelve scissor pairs 170A-170L that are each made up of one link of the first arm 156 and one link of the second arm 158 pivotally connected to one another at one of the center pivot locations 168A-168L. The proximal end 168A of the first link 160A and the proximal end 168A of first link 164A of the first scissor pair 170A are pivotally connected to the pantograph actuator 154. The distal end 168B of the twelfth link 160L and the distal end 168B of the twelfth link 164L of the twelfth scissor pair 170L are operatively connected to the flexible thin membrane structure 104. It should be appreciated that a pantograph, in a particular embodiment, can have more than or less than twelve scissors pairs and can have as few as one scissor pair.

In the undeployed state, the links 160A-160L and the links 164A-164L are substantially parallel to one another and collectively have a rectangular shape. See FIG. 17. In the transition from the undeployed state to the deployed state, (a) the proximal ends 168A of each of the scissor pairs 170A-170L move closer to one another, (b) the distal ends 168B of each of the scissor pairs 170A-170L move closer to one another, (c) the proximal end 168A of each of the links 160A-160L and the distal end of the corresponding one of the links 164A-164L of each of the scissor pairs 170A-170L move farther from one another, and (d) the proximal end 168A of each of the links 164A-164L and the distal end of the corresponding one of the links 160A-164L of each of the scissor pairs 170A-170L move farther from one another.

The pantograph actuator 154 includes a guide structure and an energy structure. The guide structure includes a lower pantograph plate 184, a post 186, mid-pantograph plate 188, and upper pantograph plate 190. The lower pantograph plate 184 is fixed to the base 110 of the housing 102. When the housing 102 is in the undeployed state, the lower pantograph plate 184, base 110 of the housing 102, and portions of the side panels 112A-112D define a membrane space 192 that encloses the flexible thin membrane structure 104 in the undeployed state. Additionally, when the housing 102 is in the undeployed state, the lower pantograph plate 184, top panel 114, and portions of the side panels 112A-112D define a pantograph space 194 that encloses the pantographs 150A, 150B, 152A, and 152B in the undeployed state. The lower pantograph plate 184 defines a hole 196 that accommodates the body of the frangible bolt 134 and other elements. Additionally, the lower plate 184 defines a first hinge ear structure 198 that accommodate the proximal end 168A of the link 160A of the first scissor pair 170A of the first arm 156 of the lower pantograph 150A and a pin to establish a fixed pivot joint between the link and the plate, i.e., the link 160A can rotate about the fixed pivot joint but the fixed pivot joint cannot move relative to the post 186. A second hinge ear structure 200 accommodates the proximal end 168A of the link 160A of the first scissor pair 170A of the first arm 156 of the lower pantograph 150B and a pin to establish a fixed pivot joint between the link and the plate.

The post 186 extends perpendicularly between the lower pantograph plate 184 and the top panel 114 when the housing is in the undeployed state. The post 186 is hollow to accommodate a portion of the frangible bolt 134 and supports the mid-pantograph plate 188 and the upper pantograph plate 190. More specifically, a portion of the exterior surface of the post 186 is cylindrical to facilitate rotation of the mid-pantograph plate 188 about the post 186. Another portion of the exterior surface of the post 188 has a "key" shape that is accommodated by a corresponding "key" hole associated with the upper pantograph plate 190 to prevent the upper pantograph plate from rotating relative to the post and to maintain a defined distance between the distance between the mid-pantograph plate 188 and the upper pantograph plate 190.

The mid-pantograph plate 188 defines a hole 210 that accommodates the cylindrical portion of the post 186 and is capable of rotating about the post 186. The mid-pantograph plate 188 has a lower surface 212 and an upper surface 214. Associated with the lower surface 212 are a first hinge ear structure 216 that accommodate the proximal end 168A of the link 164A of the first scissor pair 170A of the second arm 158 of the lower pantograph 150A and a pin to establish a rotatable pivot joint between the link and the plate, i.e., the link 164A can pivot about the rotatable pivot joint and the rotatable pivot joint can rotate about the post 186. Also associated with the lower surface are a second hinge ear structure 218 that accommodate the proximal end 168A of the link 164A of the first scissor pair 170A of the second arm 158 of the lower pantograph 150B and a pin to establish a rotatable pivot joint between the link and the plate, i.e., the link 164A can pivot about the rotatable pivot joint and the rotatable pivot joint can rotate about the post 186.

Associated with the upper surface 214 are a first hinge ear structure 220 that accommodate the proximal end 168A of the link 164A of the first scissor pair 170A of the second arm 158 of the upper pantograph 152A and a pin to establish a rotatable pivot joint between the link and the plate, i.e., the link 164A can pivot about the rotatable pivot joint and the rotatable pivot joint can rotate relative to the post 186. Also associated with the lower surface are a second hinge ear structure 222 that accommodate the proximal end 168A of the link 164A of the first scissor pair 170A of the second arm 158 of the upper pantograph 152B and a pin to establish a rotatable pivot joint between the link and the plate, i.e., the link 164A can pivot about the rotatable pivot joint and the rotatable pivot joint can rotate relative to the post 186.

The mid-pantograph plate 188 has a circular outer edge 224. However, the outer edge can have any number of shapes, provided the plate 188 is capable of being accommodated within the housing 102 when the housing is in the undeployed state and capable of rotating about the post 186 when the apparatus 100 is transitioning from the undeployed state towards the deployed state.

The upper pantograph plate 190 defines a "keyed" hole 230 that accommodates the "keyed" portion of the post 186 to prevent the upper pantograph plate 190 from rotating relative to the post 186 and to maintain the spacing between the upper pantograph plate 190 and the mid-pantograph plate 188. Associated with the upper pantograph plate 190 are a first hinge ear structure 232 that accommodate the proximal end 168A of the link 160A of the first scissor pair 170A of the first arm 156 of the upper pantograph 152A and a pin to establish a fixed pivot joint between the link and the plate. A second hinge ear structure 234 accommodate the proximal end 168A of the link 160A of the first scissor pair 170A of the first arm 156 of the upper pantograph 152B and a pin to establish a fixed pivot joint between the link and the plate.

Figure 23:
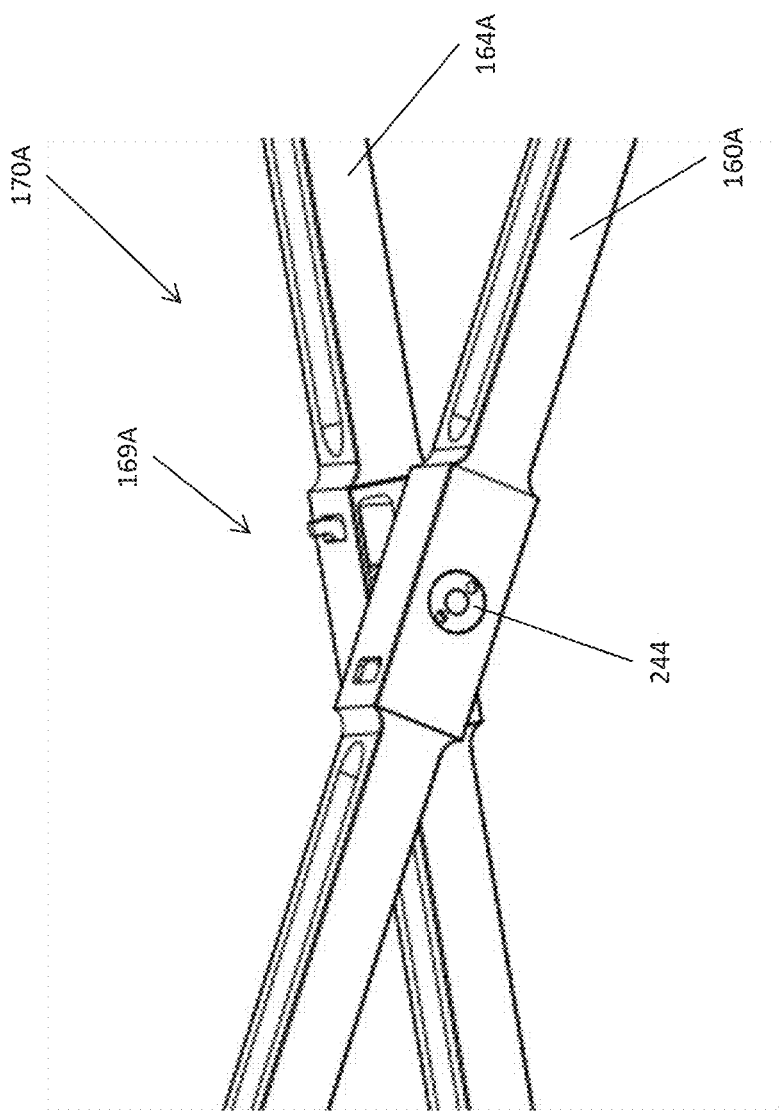
FIG. 23 is a perspective view of a center pivot joint of a pantograph and an associated spring associated with the apparatus illustrated in FIG. 17.
Figure 24A:
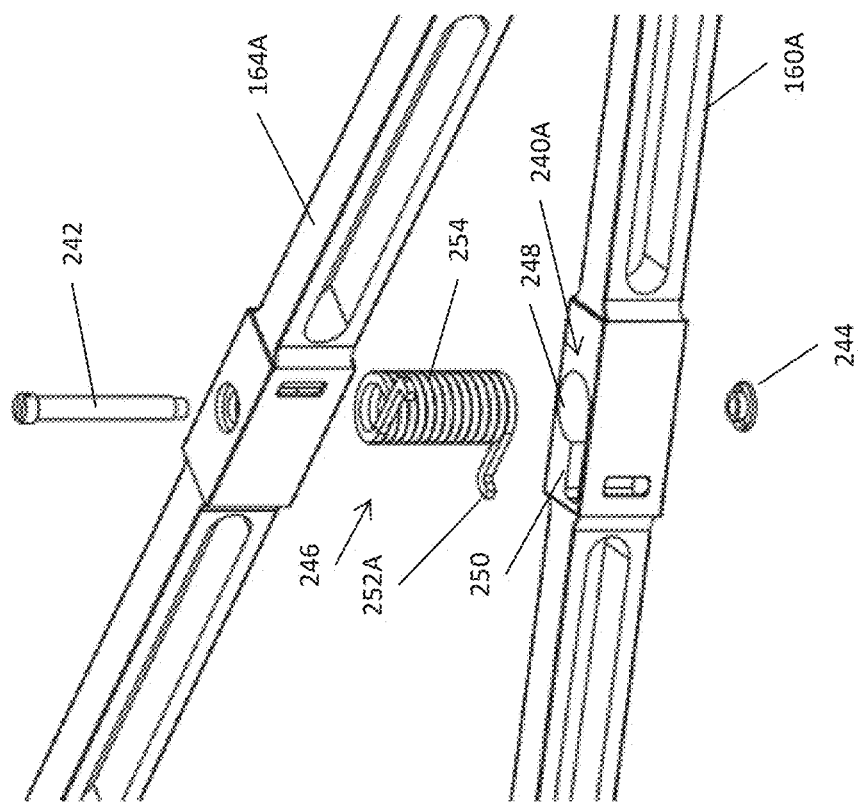
FIGS. 24A and 24B are exploded views of the center pivot joint of a pantograph and the associated spring shown in FIG. 23.
Figure 24B:
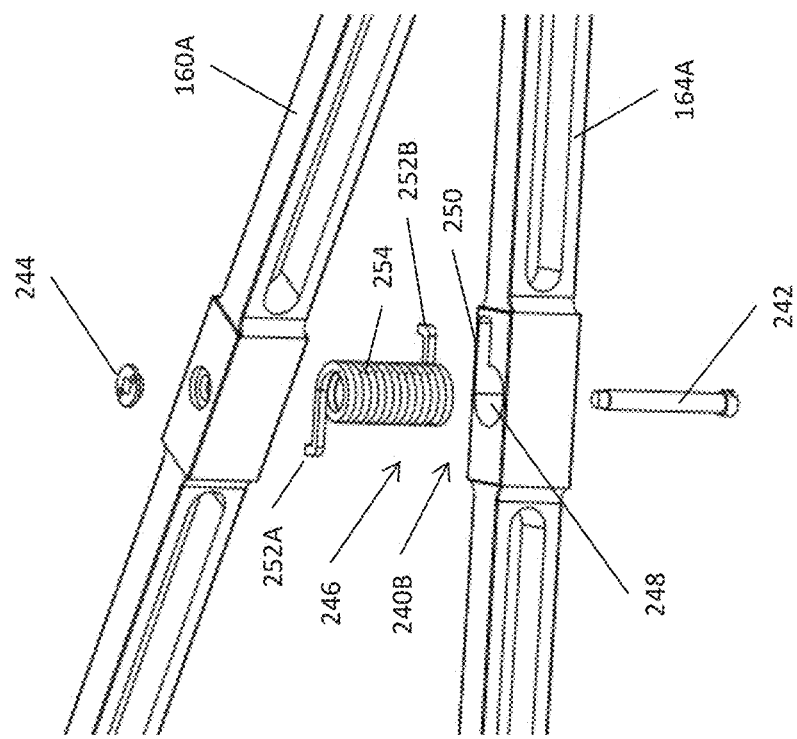

The energy structure provides energy for rotating the mid-pantograph plate 188 during the transition of the apparatus 100 from the undeployed state towards the deployed state. The energy structure comprises a plurality of springs. More specifically, a spring is associated with each of the center pivot locations 169A-169L of each of the pantographs 150A, 150B, 152A, and 152B. With reference to FIGS. 23, 24A, and 24B, the center pivot location 169A of the first scissor pair 170A of the lower pantograph 150A and the associated spring structure are described with the understanding that the other center pivot locations 169B-169L and associated springs of the lower pantograph 150A and the center pivot locations 169A-169L and associated springs of the other pantographs 150B, 152A, and 152B are substantially identical. The first scissor pair 170A comprises first link 160A of the first arm 156 and second link 164A of the second arm 158. The first and second links 160A, 164A respectively define holes 240A, 240B that, when aligned, accommodate a screw 242 that engages a nut 244 to establish a pivot connection between the links. The holes 240A, 240B are also each adapted to accommodate a portion of a torsion spring 246. More specifically, each of the holes 240A, 240B has a cylindrical portion 248 and a slot portion 250 that each accommodate a portion of the spring 246. The torsion spring 246 has first and second legs 252A, 252B and helical body 254 that extends between the first and second legs 252A, 252B. The cylindrical portion 248 of the hole 240A accommodates a portion of the helical body 254 of the spring 246 and the slot portion 250 of the hole 240A accommodates the first leg 252A of the spring 246. The cylindrical portion 248 of the hole 240B accommodates the other portion of the helical body 254 of the spring 246 and the slot portion 250 of the 240B accommodates the second leg 252B of the spring 246. In the illustrated embodiment, the torsion spring 246 is made of stainless steel. However, other material known to those in the art can be employed. Additionally, the spring 246 has a rectangular cross-section. A spring with a circular cross-section is also feasible.

However, such a spring would likely provide less torsion that the comparably sized spring 246 with a rectangular cross-section. When the pantograph 150A is in the undeployed state, the spring 246 stores potential energy that is subsequently used in transitioning the pantograph 150A from the undeployed state to the deployed state by bringing the proximal end 168A of the link 160A and the proximal end 168A of the link 164A closer to one another. In this regard, the fixed pivot location established between the proximal end 168A of the link 160A of the first scissor pair 170A of the first arm 156 of the lower pantograph 150A does not move relative to the post 186. However, rotatable pivot location established between the proximal end 168A of the link 164A of the first scissor pair 170A of the second arm 156 is capable of rotating about the post 186 if sufficient force is applied to the mid-pantograph plate 188. Rotation of the mid-pantograph plate 188 results in the fixed and rotatable pivot joints moving closer to one another. This, in turn, contributes to the transition of the lower pantograph 150A from the undeployed state towards the deployed state. The torsion springs associated with each of the center pivot joints 169A-169L of each of the pantographs 150A, 150B, 152A, and 152B collectively produce sufficient force to rotate the mid-pantograph plate 188 and thereby transition each of the pantographs from an undeployed state to a deployed state. It should be appreciated that having a torsion spring associated with each of the center pivot locations 169A-169L of each of the pantographs 150A, 150B, 152A, 152B provides a high degree of redundancy that can likely accommodate the failure of a number of the springs. It should be appreciated that associating a spring with each of less than all of the center pivot locations 169A-169L of a pantograph is feasible in many applications. Further, in certain applications, associating one or more springs with only one of the pantographs 150A, 150B, 152A, and 152B may provide sufficient energy to transition all of the pantographs from the undeployed state toward the deployed state.

The energy structure also includes a damper structure 260 that moderates the force produced by the plurality of springs during the transition from the undeployed state towards the deployed state to prevent too rapid of a transition from potentially damaging the flexible thin membrane structure 104, causing one or more of the pantographs 150A, 150B, 152A, 152B to become inoperative, and/or causing one or more of the pantographs 150A, 150B, 152, 152B to become disengaged from the flexible thin membrane structure 104. In the illustrated embodiment, the damper structure 260 is a comprised of rotary hydraulic damper with an output shaft 262, a first pulley 264 engaged to the output shaft of the damper 262, a second pulley 266, and a cable 268 with one end operatively engaged to the first pulley 264 and a second end that include a ball 270. The ball 270 is received in a recess 272 associated with the second pulley 266. In operation, the damper structure 260 resists the rotational force imparted by the springs to the mid-pantograph plate 188, thereby slowing the rotation of the plate and the transition of the pantographs from the undeployed state towards the deployed state. In the illustrated embodiment, the rotary hydraulic damper 262 is a D.E.B. Manufacturing Series 108 hydraulic damper.

Figure 25A:
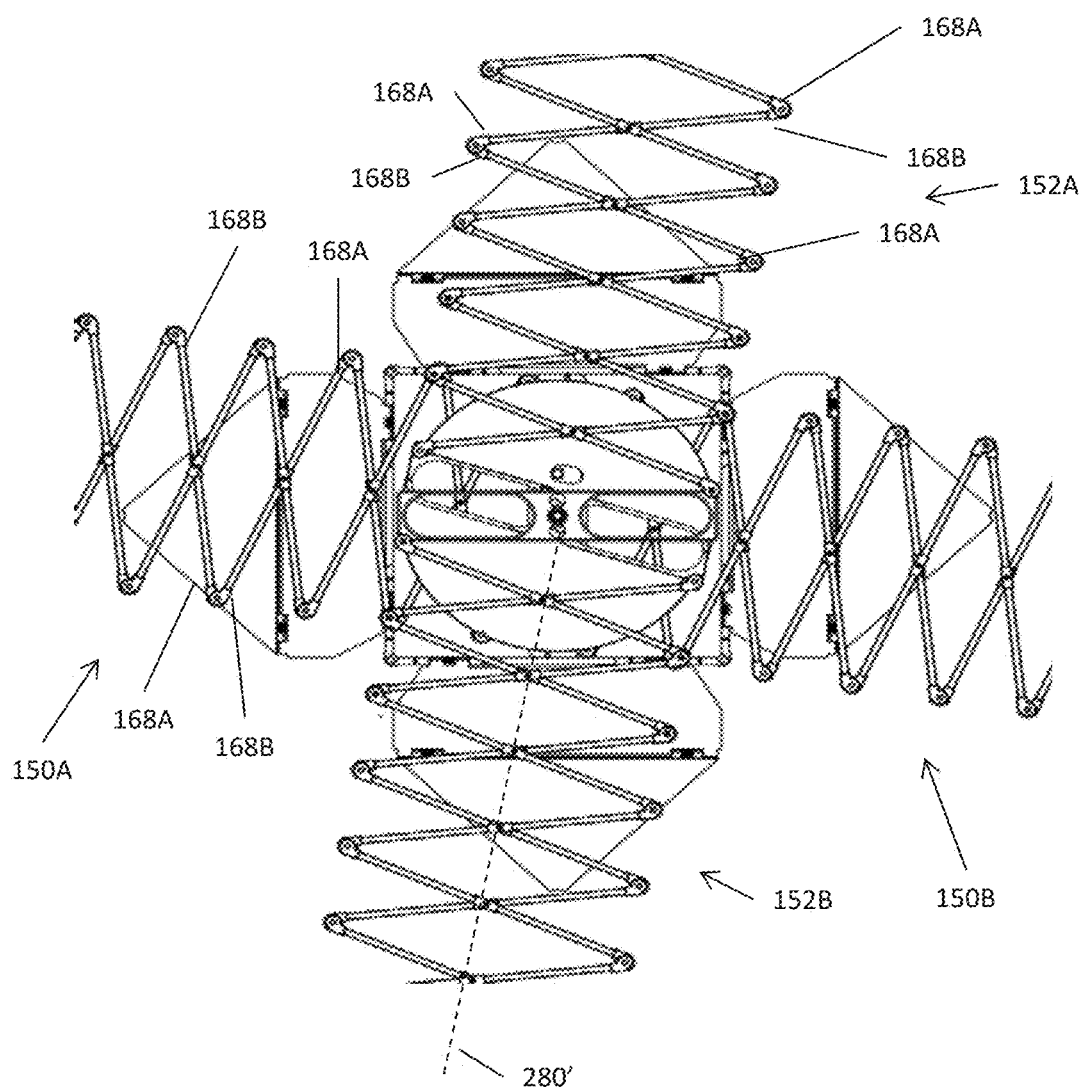
FIGS. 25A and 25B illustrate the pantographs of the apparatus illustrated in FIG. 17 at two different points in time during the transition of the apparatus shown from an undeployed state towards a deployed state.
Figure 25B:
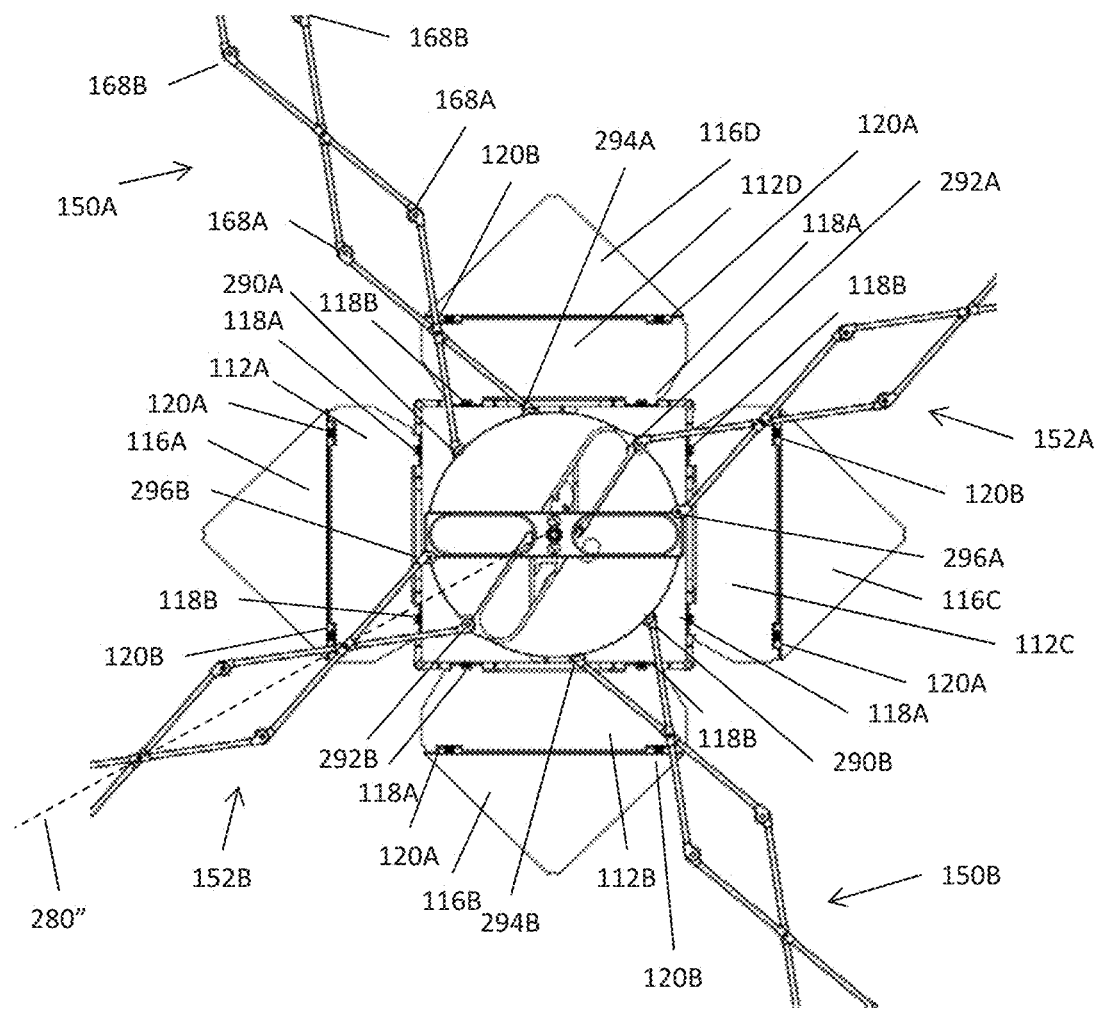

The operation of the apparatus 100 in transition from an undeployed state towards a deployed state is now described. In the undeployed state, the apparatus 100 appears as shown in FIG. 1. The transition of the apparatus from the undeployed state to the deployed state commences with an electrical signal being applied to the bolt actuator 142 that, in response, causes the bolt 134 to fracture. Once the bolt 134 is fractured, a spring associated with the actuator applies a force to the portion of the fractured bolt that includes the head 136 and the washer 140 that moves the head and the washer away from the base 110 of the housing 102. With reference to FIGS. 25A and 25B, once the head 136 and washer 140 have been moved a sufficient distance away from the base 110, the four pairs of springs 118A, 118B extending between the base 110 and the side panels 112A-112D and the four pairs of springs 120A, 120B extending between the side panels 112A-112D and the related triangular panels 116A-116D operate to place the base 110, the side panels 112A-112D, and triangular panels 116A-116D in a substantially planar configuration in which the side panels and triangular panels are unlikely to interfere with the deployment of the flexible thin membrane structure 104.

As the side panels 112A-112D and triangular panels 116A-116D begin to move away from undeployed state to the deployed state, the potential energy stored in each of the springs 246 associated with the two lower pantographs 150A, 150B and the two upper pantographs 152A, 152B is converted to kinetic energy that results in a force being applied by each of the pantographs 150A, 150B, 152A, and 152B to the mid-pantograph plate 188 via the rotatable pivot joints 290A, 290B, 292A, and 292B (See FIG. 25B). The applied forces cause the mid-pantograph plate 188 to rotate about the post 186, the rotation being moderated by the operation of the damper structure 260. The rotation of the mid-pantograph plate 188, in turn, causes the rotatable pivot joint of each of the pantographs to move closer to the fixed pivot joint of the corresponding pantograph, thereby extending each of the pantographs and the portion of the flexible membrane structure 104 engaged by each of the pantographs to transition the apparatus 100 from the undeployed state towards the deployed state. Notably, each of the rotatable pivot joints 290A, 290B, 292A, and 292B respectively moves closer to the corresponding fixed pivot joint 294A, 294B, 296A, and 296B along a circular arc.

The rotation of the rotatable pivot joints about the post 186 also causes the pantographs to rotate during the transition from the undeployed state towards the deployed state. With reference to FIGS. 25A and 25B, the rotation of the pantographs is described with respect to upper pantograph 152B. In FIG. 25A, the mid-pantograph plate 188 is shown after rotating about 15° relative to the undeployed position of the plate. With this orientation of the mid-pantograph plate 188, the position of upper pantograph 152B is defined by a line 280' that passes through the post 186 and the center pivot joints 169A-169L of the upper pantograph 152B. In FIG. 25B, the mid-pantograph plate 188 is shown after rotating about 135° relative to the undeployed position of the plate. With this orientation of the mid-pantograph plate 188, the position of the pantograph is represented by the a line 280" that passes through the post 186 and the center pivot joints 169A-169L of the upper pantograph 152B. A comparison of the line 280' to line 280" shows that the upper pantograph 152B rotates about the post 186 during the transition from the undeployed state towards the deployed state. The other pantographs 150A, 150B, and 152A each rotate in the same manner.

The foregoing description of the invention is intended to explain the best mode known of practicing the invention and to enable others skilled in the art to utilize the invention in various embodiments and with the various modifications required by their particular applications or uses of the invention.

What is claimed is:

1. A deployable thin membrane structure capable of being used with a spacecraft, the deployable thin membrane structure comprising:
   a flexible membrane structure; and
   a deployment mechanism for transitioning the flexible membrane structure from an undeployed state in which the flexible membrane structure is substantially incapable of providing a desired function to a deployed state in which the flexible membrane structure is capable of providing the desired function;
   wherein the deployment mechanism includes a plurality of pantograph structures, each associated with a different portion of the flexible membrane structure;
   wherein each of the plurality of pantograph structures includes first and second arms that each extend from a first terminal end to a second terminal end, the first and second arms pivotally connected to one another at an intermediate pivot location that is in between the first and second terminal ends of each of the first and second arms;
   wherein the second terminal ends of the first and second arms of each of the plurality of pantograph structures operatively engage the flexible membrane structure;
   wherein, when the plurality of pantograph structures are in the undeployed state, the first terminal end of the first arm is substantially adjacent to the second terminal end of the second arm and the first terminal end of the second arm is substantially adjacent to the second terminal end of the first arm for each of the plurality of pantograph structures;
   wherein, when the plurality of pantograph structures transition from an undeployed state towards a deployed state, (a) the first terminal ends of the first and second arms move closer to one another, (b) the second terminal ends of the first and second arms move closer to one another, (c) the second terminal end of the first arm moves farther from the first terminal end of the second arm, and (d) the second terminal end of the second arm moves farther from the first terminal end of the first arm for each of the plurality of pantograph structures;
   wherein the deployment mechanism includes a guide structure for engaging each of the plurality of pantograph structures and coordinating the transition of the plurality of pantograph structures with respect to one another;
   wherein the guide structure includes a rotor adapted to rotate about an axis;
   wherein the first terminal end of the second arm is pivotally connected to the rotor at a rotatable pivot location spaced from the axis for each of the plurality of pantograph structures; and
   the first terminal end of the first arm is pivotally connected at a fixed pivot location that is fixed relative to the axis for each of the plurality of pantograph structures.

2. A deployable thin membrane structure, as claimed in claim 1, wherein:
   the rotatable pivot location for each of the plurality of pantograph structures is located at a first distance from the axis;
   the fixed pivot location for each of the plurality of pantograph structures is located at a second distance from the axis; and
   the first distance is substantially equal to the second distance.

3. A deployable thin membrane structure, as claimed in claim 1, wherein:
   the length of the first and second arms for each of the plurality of pantograph structures is less than the diameter of the rotor.

4. A deployable thin membrane structure, as claimed in claim 1, wherein:
   the intermediate pivot location for each of the plurality of pantograph structures rotates about the axis during the transition of the plurality of pantograph structures from the undeployed state towards the deployed state.

5. A deployable thin membrane structure, as claimed in claim 1, further comprising:
   a spring for providing energy to rotate the rotor about the axis and thereby transition the plurality of pantograph structures from the undeployed state towards the deployed state.

6. A deployable thin membrane structure, as claimed in claim 5, wherein:
   the spring is associated with one of the plurality of pantograph structures.

7. A deployable thin membrane structure, as claimed in claim 5, wherein:
   the spring is associated with the intermediate pivot location of the one of the plurality of pantograph structures.

8. A deployable thin membrane structure, as claimed in claim 5, wherein:
   the spring engages the rotor and a housing.

9. A deployable thin membrane structure, as claimed in claim 1, further comprising:
   a damper for controlling the rate of rotation of the rotor about the axis.

10. A deployable thin membrane structure capable of being used with a spacecraft, the deployable thin membrane structure comprising:
    a flexible membrane structure; and
    a deployment mechanism for transitioning the flexible membrane structure from an undeployed state in which the flexible membrane structure is substantially incapable of providing a desired function to a deployed state in which the flexible membrane structure is capable of providing a desired function;
    wherein the deployment mechanism includes a pantograph structure with a first and second arms that each extend from a first terminal end to a second terminal end, the first and second arms pivotally connected to one another at an intermediate pivot location that is in between the first and second terminal ends of each of the first and second arms;
    wherein the second terminal ends of the first and second arms operatively engage the flexible membrane structure;
    wherein, when the pantograph structure is in the undeployed state, the first terminal end of the first arm is substantially adjacent to the second terminal end of the second arm and the first terminal end of the second arm is substantially adjacent to the second terminal end of the first arm;
    wherein, when the pantograph structure transitions from an undeployed state towards a deployed state, (a) the first terminal ends of the first and second arms move closer to one another, (b) the second terminal ends of the first and second arms move closer to one another, (c) the second terminal end of the first arm moves farther from the first terminal end of the second arm, and (d) the second terminal end of the second arm moves farther from the first terminal end of the first arm for each of the plurality of pantograph structures;

wherein the deployment mechanism includes a guide structure for causing the first terminal ends of the first and second arms to move closer to one another along a curved line;

the guide structure includes a rotor adapted to rotate about an axis;

wherein the first terminal end of the second arm is pivotally connected to the rotor at a rotatable pivot location spaced from the axis.

11. A deployable thin membrane structure, as claimed in claim 10, wherein:

the first terminal end of the first arm is pivotally connected at a fixed pivot location that is fixed relative to the axis.

12. A deployable thin membrane structure, as claimed in claim 11, wherein:

the rotatable pivot location is located at a first distance from the axis; and the fixed pivot location is located at a second distance from the axis.

13. A deployable thin membrane structure, as claimed in claim 12, wherein:

the first distance is substantially equal to the second distance.

14. A deployable thin membrane structure, as claimed in claim 10, wherein:

the intermediate pivot location rotates about the axis during the transition of the pantograph from the undeployed state towards the deployed state.

15. A deployable thin membrane structure, as claimed in claim 10, further comprising:

a spring for providing energy to transition the pantograph structure from the undeployed state towards the deployed state.

16. A deployable thin membrane structure, as claimed in claim 15, wherein:

the spring is associated with the intermediate pivot location.

17. A deployable thin membrane structure, as claimed in claim 10, further comprising:

a damper for controlling the rate of rotation of the rotor about the axis.

* * * * *